United States Patent
Khoshnevisan et al.

(10) Patent No.: US 11,082,984 B2
(45) Date of Patent: Aug. 3, 2021

(54) FREQUENCY DOMAIN RESOURCE ALLOCATION FOR FREQUENCY DIVISION MULTIPLEXING SCHEMES WITH SINGLE DOWNLINK CONTROL INFORMATION ASSOCIATED WITH MULTIPLE TRANSMISSION CONFIGURATION INDICATION STATES

(71) Applicant: QUALCOMM Incorporated, San Diego, CA (US)

(72) Inventors: Mostafa Khoshnevisan, San Diego, CA (US); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/803,732

(22) Filed: Feb. 27, 2020

(65) Prior Publication Data

US 2020/0404667 A1    Dec. 24, 2020

Related U.S. Application Data

(60) Provisional application No. 62/865,730, filed on Jun. 24, 2019.

(51) Int. Cl.
*H04W 72/04* (2009.01)
*H04L 5/00* (2006.01)
(Continued)

(52) U.S. Cl.
CPC ...... *H04W 72/0493* (2013.01); *H04B 7/0456* (2013.01); *H04L 5/0092* (2013.01);
(Continued)

(58) Field of Classification Search
CPC ... H04W 72/04; H04W 72/12; H04W 72/042; H04W 72/046; H04W 72/1289;
(Continued)

(56) References Cited

U.S. PATENT DOCUMENTS

2017/0367046 A1* 12/2017 Papasakellariou .... H04L 5/0048
2019/0297605 A1*  9/2019 Kim ...................... H04L 5/0044
(Continued)

FOREIGN PATENT DOCUMENTS

EP          3684128 A1    7/2020
WO    WO-2019095848 A1    5/2019

OTHER PUBLICATIONS

International Search Report and Written Opinion—PCT/US2020/032671—ISA/EPO—dated Aug. 26, 2020.
(Continued)

*Primary Examiner* — Asad M Nawaz
*Assistant Examiner* — Najeeb Ansari
(74) *Attorney, Agent, or Firm* — Harrity & Harrity, LLP / Qualcomm

(57) ABSTRACT

Various aspects of the present disclosure generally relate to wireless communication. In some aspects, a user equipment (UE) may receive a downlink control information (DCI) message that includes a frequency domain resource allocation field to indicate allocated resource blocks (RBs) across multiple transmission configuration indication (TCI) states. The UE may identify, based at least in part on the DCI message and/or a radio resource control configuration, at least one parameter that indicates a unit of contiguous RBs over which the same precoding is used and/or a resource allocation type. The UE may assign the allocated RBs to individual TCI states among the multiple TCI states based at least in part on the unit of contiguous RBs over which the
(Continued)

same precoding is used and/or the resource allocation type. Numerous other aspects are provided.

30 Claims, 18 Drawing Sheets

(51) Int. Cl.
 *H04W 76/27* (2018.01)
 *H04B 7/0456* (2017.01)
(52) U.S. Cl.
 CPC ..... *H04W 72/042* (2013.01); *H04W 72/0453* (2013.01); *H04W 76/27* (2018.02)
(58) Field of Classification Search
 CPC ......... H04W 72/1273; H04W 72/0413; H04W 72/0453; H04W 72/14; H04W 48/12; H04W 72/02; H04W 72/044; H04W 16/28; H04W 72/048; H04W 52/0216; H04W 74/006
 See application file for complete search history.

(56) References Cited

U.S. PATENT DOCUMENTS

| | | | |
|---|---|---|---|
| 2019/0297607 A1* | 9/2019 | Kim | H04L 5/0039 |
| 2019/0342907 A1* | 11/2019 | Huang | H04L 5/0048 |
| 2020/0107353 A1* | 4/2020 | Jung | H04W 72/042 |
| 2020/0112419 A1* | 4/2020 | Bagheri | H04L 5/0048 |

OTHER PUBLICATIONS

Nokia: "CR to 38.214 Capturing the RAN1#94 Meeting Agreements", 3GPP Draft, 38214 CR0005, (REL-15), 3GPP TSG-RAN1 Meeting #94, R1-1810021, 3rd Generation Partnership Project (3GPP), Mobile Competence Centre, 650, Route Des Lucioles, F-06921 Sophia-Antipolis Cedex, France, vol. RAN WG1, No. Gothenburg, Sweden, 20180820-20180824, Sep. 6, 2018 (Sep. 6, 2018), XP051513120, 96 pages, Retrieved from the Internet: URL: http://www.3gpp.org/ftp/tsg%5FranrTSG%5FRAN/TSGR%5F81/ Docs/RP%2D181789%2Ezip. [retrieved on Sep. 6, 2018] paragraph [5.1.2.2] - paragraph [5.1.2.3] paragraph [5.1.5] paragraph [5.2.2.3] paragraph [6.1.2.2] - paragraph [6.1.3].

* cited by examiner

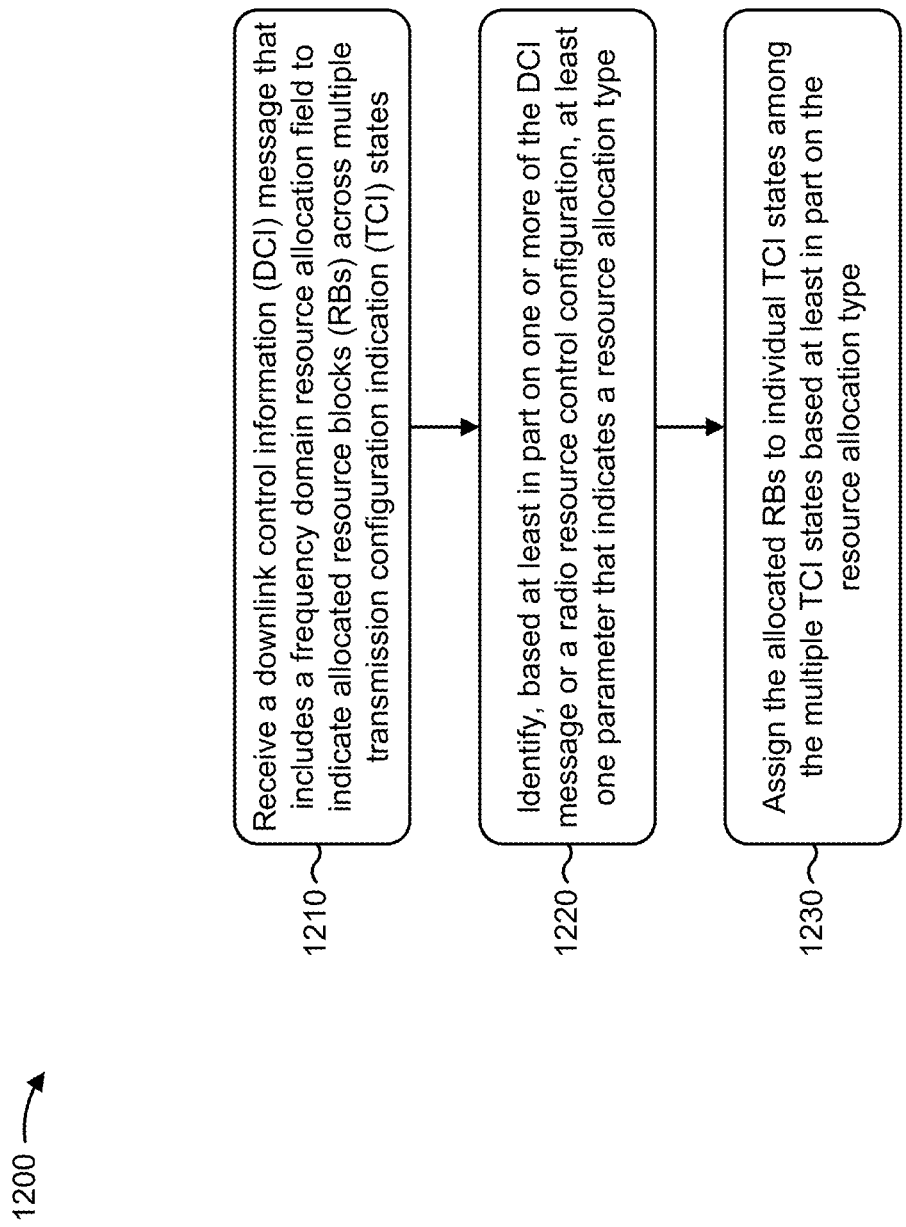

FREQUENCY DOMAIN RESOURCE ALLOCATION FOR FREQUENCY DIVISION MULTIPLEXING SCHEMES WITH SINGLE DOWNLINK CONTROL INFORMATION ASSOCIATED WITH MULTIPLE TRANSMISSION CONFIGURATION INDICATION STATES

CROSS-REFERENCE TO RELATED APPLICATION

This application claims priority to U.S. Provisional Application No. 62/865,730, filed on Jun. 24, 2019, entitled "FREQUENCY DOMAIN RESOURCE ALLOCATION FOR FREQUENCY DIVISION MULTIPLEXING SCHEMES WITH SINGLE DOWNLINK CONTROL INFORMATION ASSOCIATED WITH MULTIPLE TRANSMISSION CONFIGURATION INDICATION STATES," which is hereby expressly incorporated by reference herein.

FIELD OF THE DISCLOSURE

Aspects of the present disclosure generally relate to wireless communication and to techniques and apparatuses for assigning a frequency domain resource allocation (FDRA) indicated in a single downlink control information (DCI) message to multiple transmission configuration indication (TCI) states.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include: receiving a downlink control information (DCI) message that includes a frequency domain resource allocation (FDRA) field to indicate allocated resource blocks (RBs) across multiple transmission configuration indication (TCI) states; identifying, based at least in part on one or more of the DCI message or a radio resource control (RRC) configuration, at least one parameter that indicates a unit of contiguous RBs over which the same precoding is used, wherein the at least one parameter includes one or more of a precoding RB group (PRG) size or a physical RB (PRB) bundle size; and assigning the allocated RBs to individual TCI states among the multiple TCI states based at least in part on the at least one parameter that indicates the unit of contiguous RBs over which the same precoding is used.

In some aspects, a UE for wireless communication may include a memory and one or more processors operatively coupled to the memory. The memory and the one or more processors may be configured to: receive a DCI message that includes an FDRA field to indicate allocated RBs across multiple TCI states; identify, based at least in part on one or more of the DCI message or an RRC configuration, at least one parameter that indicates a unit of contiguous RBs over which the same precoding is used, wherein the at least one parameter includes one or more of a PRG size or a PRB bundle size; and assign the allocated RBs to individual TCI states among the multiple TCI states based at least in part on the at least one parameter that indicates the unit of contiguous RBs over which the same precoding is used.

In some aspects, a non-transitory computer-readable medium may store one or more instructions for wireless communication. The one or more instructions, when executed by one or more processors of a UE, may cause the one or more processors to: receive a DCI message that includes an FDRA field to indicate allocated RBs across multiple TCI states; identify, based at least in part on one or more of the DCI message or an RRC configuration, at least one parameter that indicates a unit of contiguous RBs over which the same precoding is used, wherein the at least one parameter includes one or more of a PRG size or a PRB bundle size; and assign the allocated RBs to individual TCI states among the multiple TCI states based at least in part on the at least one parameter that indicates the unit of contiguous RBs over which the same precoding is used.

In some aspects, an apparatus for wireless communication may include: means for receiving a DCI message that includes an FDRA field to indicate allocated RBs across multiple TCI states; means for identifying, based at least in part on one or more of the DCI message or an RRC configuration, at least one parameter that indicates a unit of contiguous RBs over which the same precoding is used, wherein the at least one parameter includes one or more of a PRG size or a PRB bundle size; and means for assigning the allocated RBs to individual TCI states among the multiple TCI states based at least in part on the at least one parameter that indicates the unit of contiguous RBs over which the same precoding is used.

In some aspects, a method of wireless communication, performed by a UE, may include: receiving a DCI message that includes an FDRA field to indicate allocated RBs across multiple TCI states; identifying, based at least in part on one or more of the DCI message or an RRC configuration, at least one parameter that indicates a resource allocation type; and assigning the allocated RBs to individual TCI states among the multiple TCI states based at least in part on the resource allocation type.

In some aspects, a UE for wireless communication may include a memory and one or more processors operatively coupled to the memory. The memory and the one or more processors may be configured to: receive a DCI message that includes an FDRA field to indicate allocated RBs across multiple TCI states; identify, based at least in part on one or more of the DCI message or an RRC configuration, at least one parameter that indicates a resource allocation type; and assign the allocated RBs to individual TCI states among the multiple TCI states based at least in part on the resource allocation type.

In some aspects, a non-transitory computer-readable medium may store one or more instructions for wireless communication. The one or more instructions, when executed by one or more processors of a UE, may cause the one or more processors to: receive a DCI message that includes a FDRA field to indicate allocated RBs across multiple TCI states; identify, based at least in part on one or more of the DCI message or an RRC configuration, at least one parameter that indicates a resource allocation type; and assign the allocated RBs to individual TCI states among the multiple TCI states based at least in part on the resource allocation type.

In some aspects, an apparatus for wireless communication may include: means for receiving a DCI message that includes an FDRA field to indicate allocated RBs across multiple TCI states; means for identifying, based at least in part on one or more of the DCI message or an RRC configuration, at least one parameter that indicates a resource allocation type; and means for assigning the allocated RBs to individual TCI states among the multiple TCI states based at least in part on the resource allocation type.

Aspects generally include a method, apparatus, system, computer program product, non-transitory computer-readable medium, user equipment, base station, transmit receive point, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 11-12 are diagrams illustrating example processes performed, for example, by a UE, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
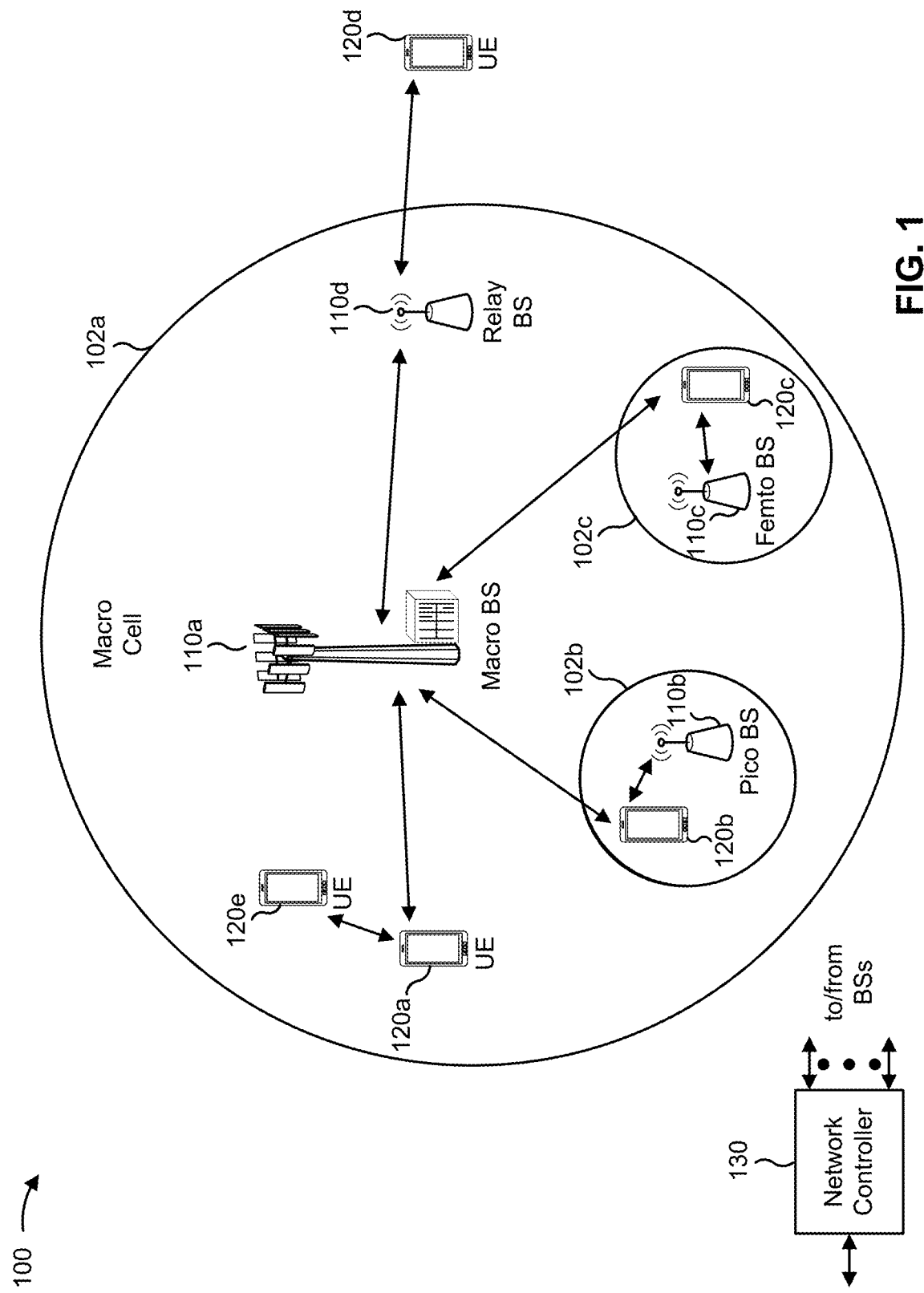
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
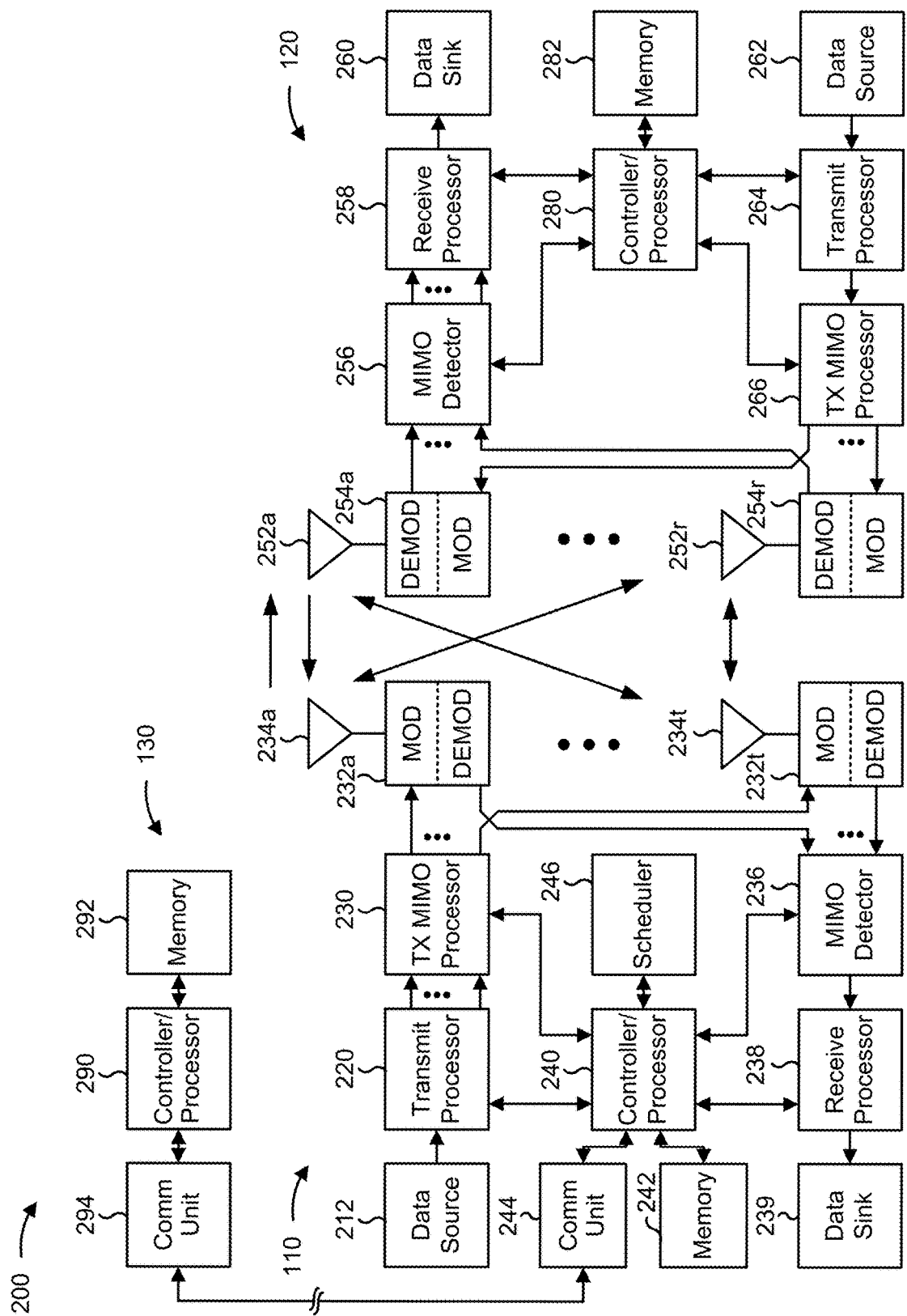
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with a frequency domain resource allocation (FDRA) for frequency division multiplexing (FDM) schemes with single downlink control information (DCI) associated with multiple transmission configuration indication (TCI) states, as described in more detail elsewhere herein. For example, controller/processor 240 of base station 110, controller/processor 280 of UE 120, and/or any other component(s) of FIG. 2 may perform or direct operations of, for example, process 1100 of FIG. 11, process 1200 of FIG. 12, or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direction operations of, for example, process 1100 of FIG. 11, process 1200 of FIG. 12, and/or other processes as described herein. A scheduler 246 may schedule UEs for data transmission on the downlink and/or uplink.

In some aspects, UE 120 may include means for receiving a DCI message that includes an FDRA field to indicate allocated resource blocks (RBs) across multiple TCI states, means for identifying, based at least in part on one or more of the DCI message or a radio resource control (RRC) configuration, at least one parameter that indicates a unit of contiguous RBs over which the same precoding is used, means for assigning the allocated RBs to individual TCI states among the multiple TCI states based at least in part on the at least one parameter that indicates the unit of contiguous RBs over which the same precoding is used, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

Additionally, or alternatively, in some aspects UE 120 may include means for receiving a DCI message that includes an FDRA field to indicate allocated RBs across multiple TCI states, means for identifying, based at least in part on one or more of the DCI message or an RRC configuration, at least one parameter that indicates a resource allocation type, means for assigning the allocated RBs to individual TCI states among the multiple TCI states based at least in part on the resource allocation type, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3A:
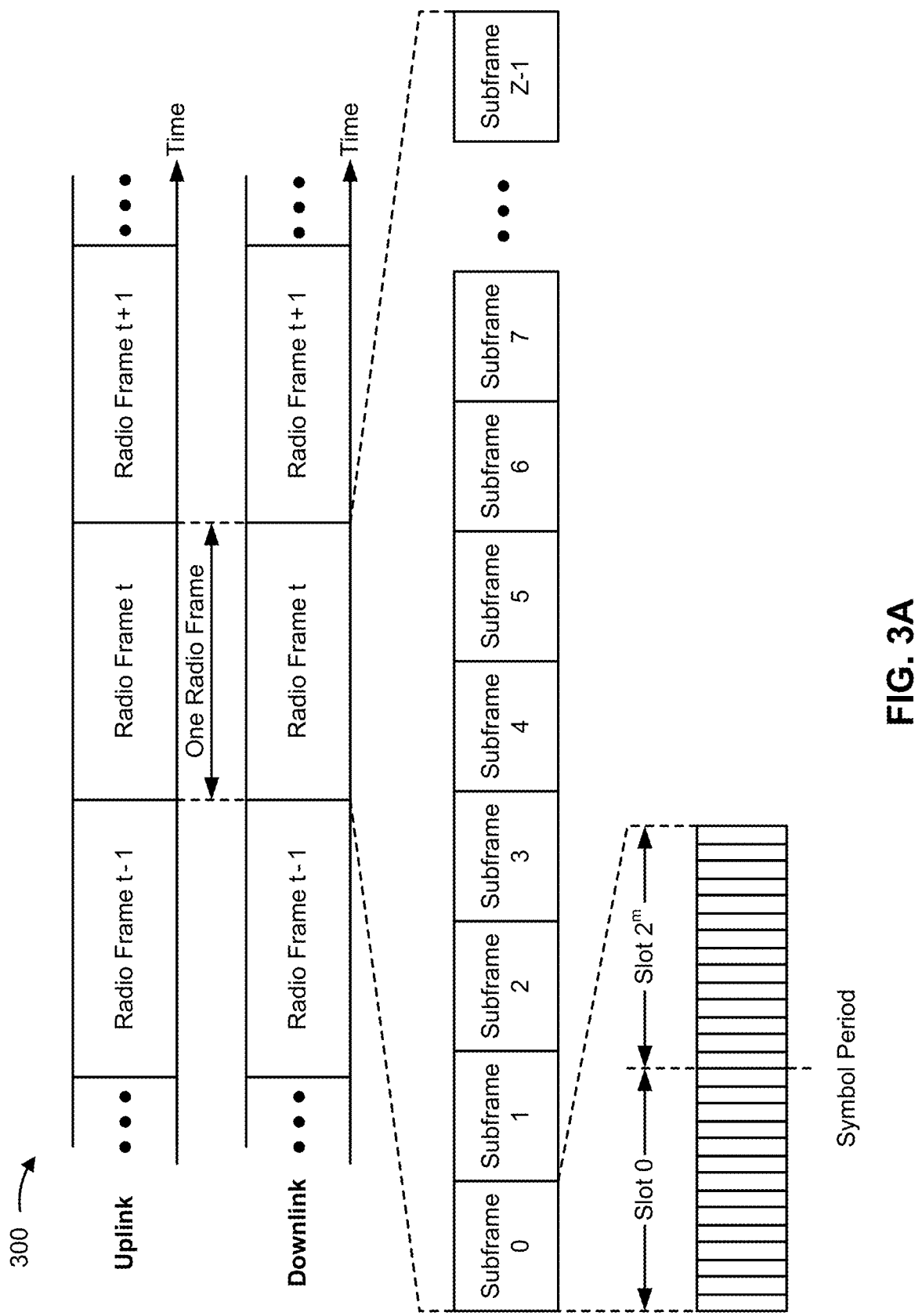
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
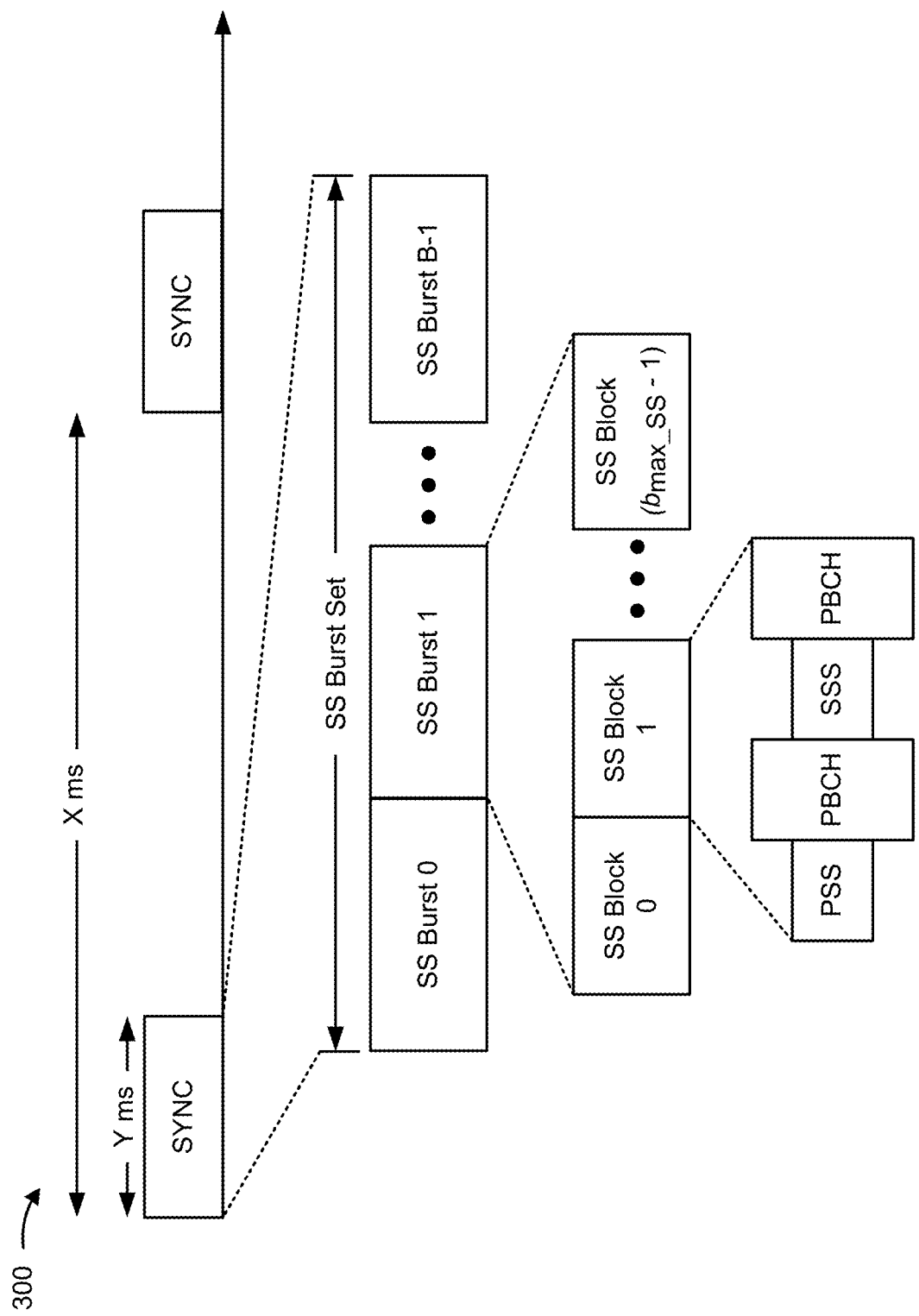
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS}-1$), where $b_{max\_SS}-1$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
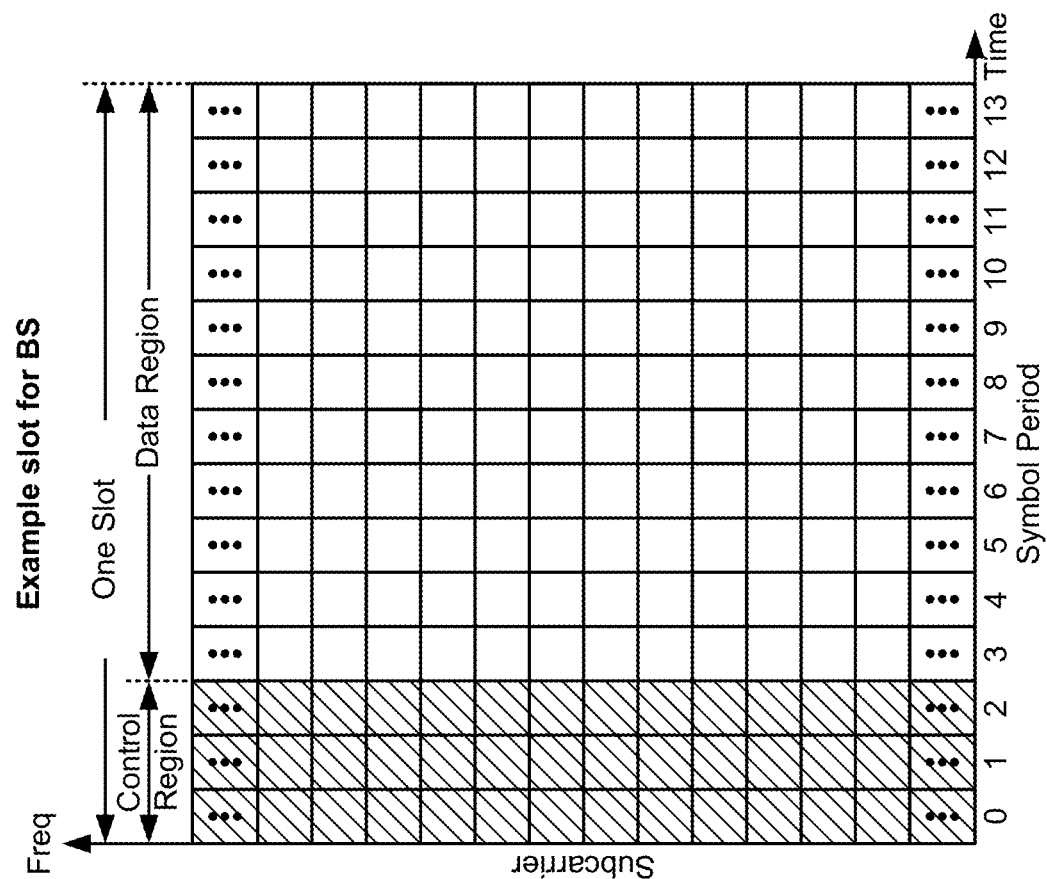
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q∈{0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

Figure 5:
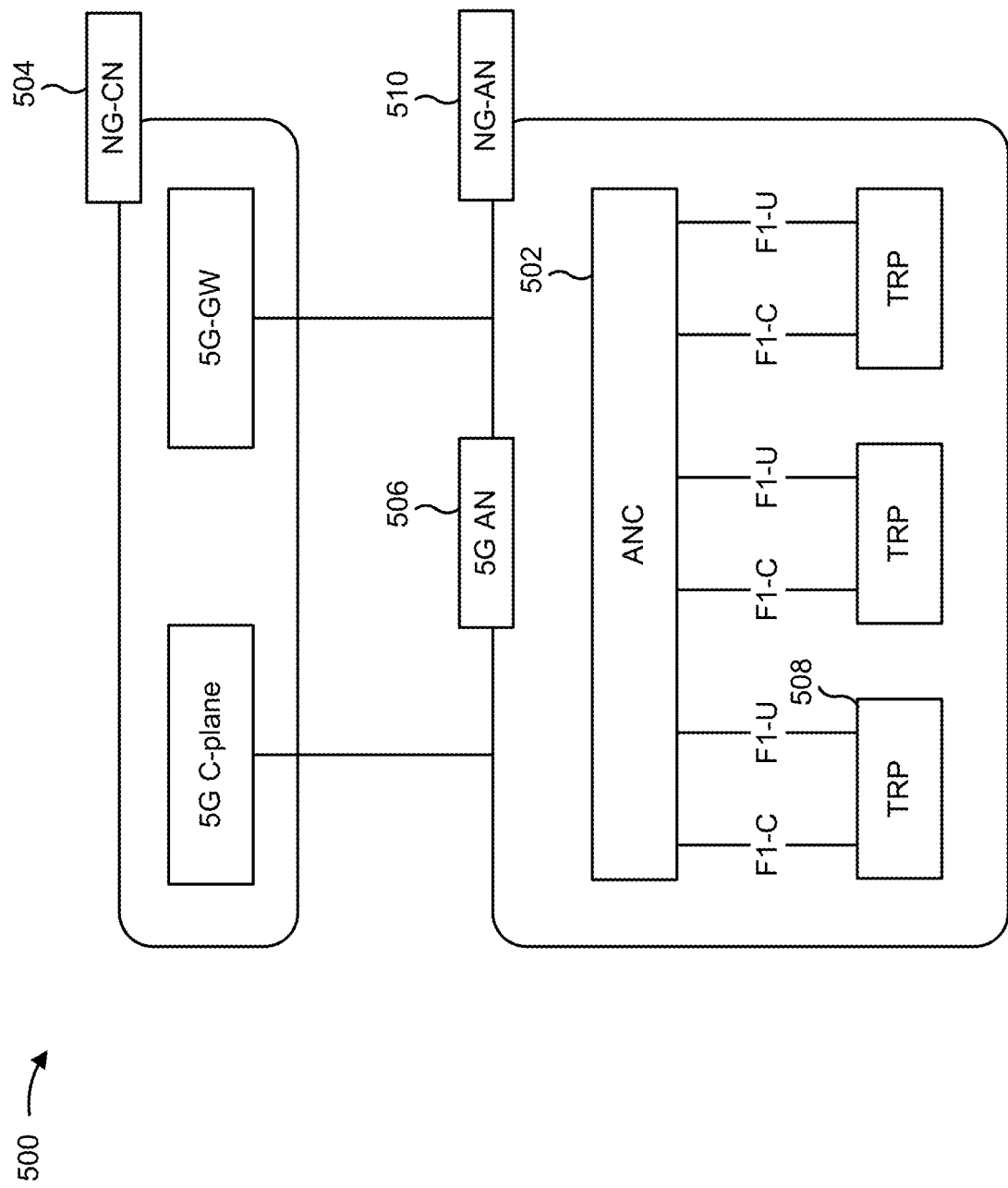
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided as an example. Other examples may differ from what is described with regard to FIG. 5.

Figure 6:
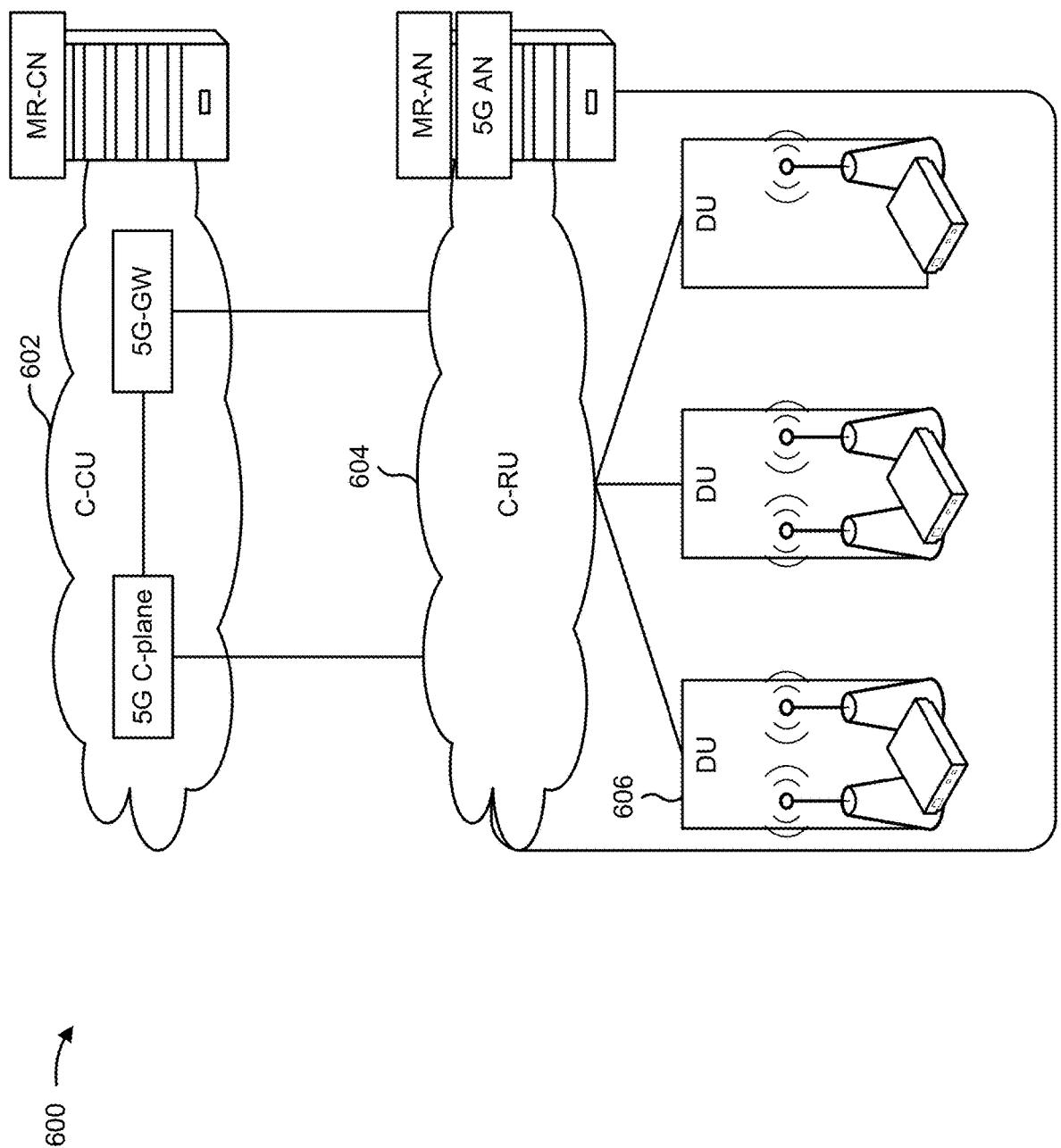
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided as an example. Other examples may differ from what is described with regard to FIG. 6.

Figure 7:
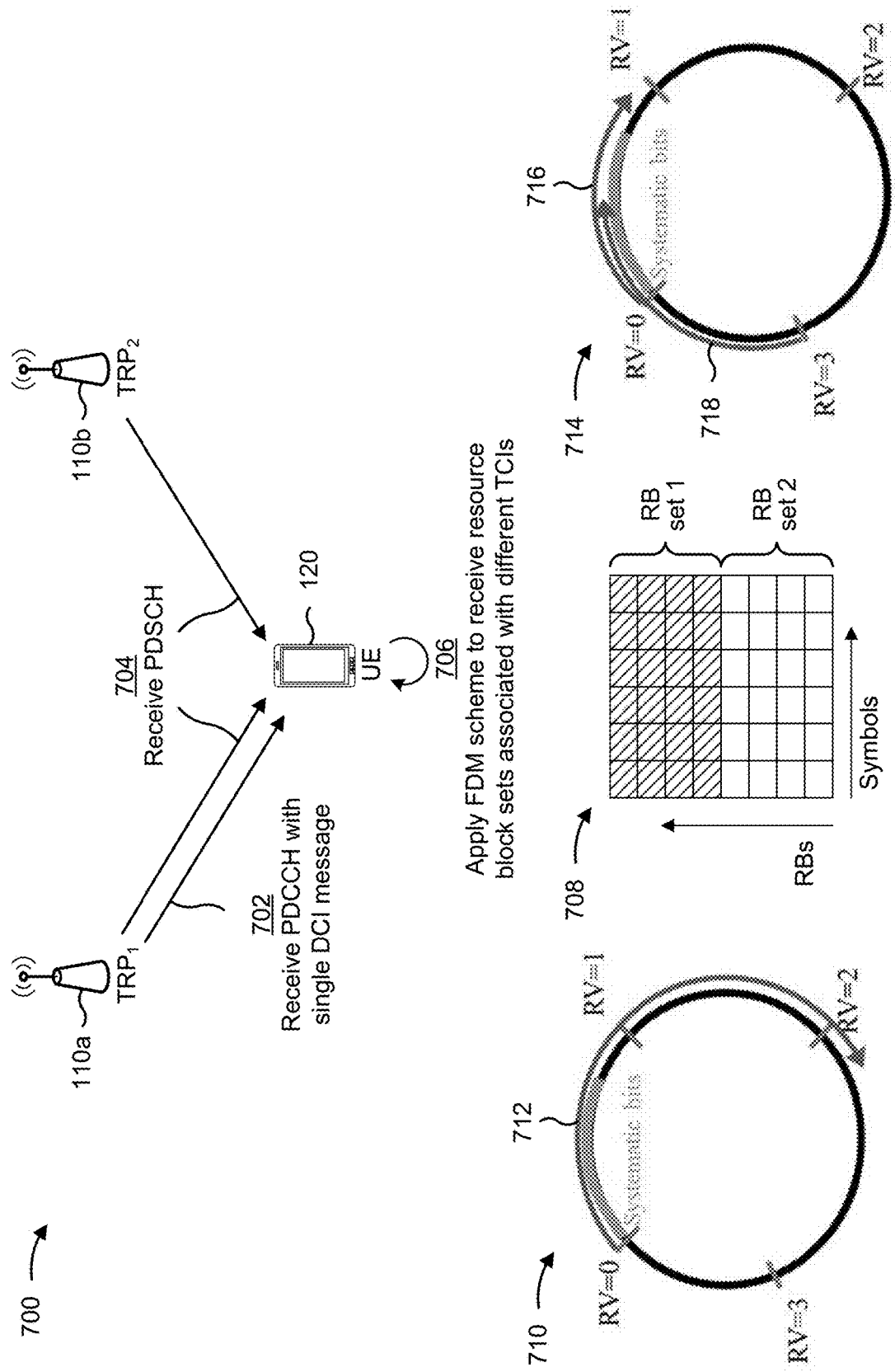
FIG. 7 is a diagram illustrating an example of a multi-transmit receive point (TRP) communication with single downlink control information (DCI), in accordance with various aspects of the present disclosure.

FIG. 7 is a diagram illustrating an example 700 of a multi-transmit receive point (TRP) communication with single downlink control information (DCI), in accordance with various aspects of the present disclosure.

As shown in FIG. 7, multiple TRPs 110 (shown as TRP$_1$ 110a and TRP$_2$ 110b) may communicate with the same UE 120 in a coordinated manner (e.g., using coordinated multi-point transmissions and/or the like) to improve reliability, increase throughput, and/or the like. The TRPs 110 may coordinate these communications via a backhaul, which may have a smaller delay or higher capacity when the TRPs 110 are co-located (e.g., where the TRPs 110 correspond to different antenna arrays of a particular base station) or may have a larger delay or lower capacity when the TRPs 110 are not co-located (e.g., located at different base stations).

In some aspects, TRP$_1$ 110a and TRP$_2$ 110b may be referred to herein as a multi-TRP group. As used herein, a multi-TRP group may refer to a set of TRPs 110 that are to communicate with the same UE 120, a set of TRPs 110 managed as a group by an access node controller, a set of TRPs 110 that transmit the same physical downlink shared channel (PDSCH), a set of TRPs 110 that transmit individual PDSCHs simultaneously or contemporaneously, and/or the like.

A TRP 110 also may be referred to as a BS, an NR BS, a Node B, a 5G NB, an AP, a gNB, a panel, a remote radio head (RRH), or some other term, or may be used interchangeably with "cell." In some aspects, multiple TRPs 110 may be included in a single BS (e.g., using respective antenna panels or quasi co-location (QCL) relationships). In some aspects, different TRPs 110 may be included in different BSs. A TRP 110 may use one or more antenna ports. A set of TRPs 110 (e.g., TRP$_1$ 110a and TRP$_2$ 110b) may be configured to individually (such as using dynamic selection) or jointly (such as using joint transmission) serve traffic to a UE 120. TRPs 110 may be coordinated by or cooperative via an access node controller (ANC). In some aspects, no inter-TRP interface may be needed or present.

As shown in FIG. 7, and by reference number 702, a set of TRPs 110 may operate in a single downlink control information (DCI) mode, where UE 120 receives a single physical downlink control channel (PDCCH) from one TRP 110 (e.g., TRP$_1$ 110a in the illustrated example 700), and the single PDCCH schedules subsequent communications from each TRP 110 in the multi-TRP group (e.g., TRP$_1$ 110a and TRP$_2$ 110b in the illustrated example 700). For example, as further shown in FIG. 7, and by reference number 704, the subsequent communications may be physical downlink shared channels (PDSCHs), which may be common between TRP$_1$ 110a and TRP$_2$ 110b or may be different (e.g., different payload, different modulation and/or coding schemes, different transmit powers, different repetition schemes, and/or the like). In some aspects, as mentioned above, the multiple TRPs 110a, 110b may be different panels of a particular base station, may be associated with the same or different cell identifiers, may have the same or different physical cell identities (PCIs), and/or the like. However, from a perspective of UE 120, transmissions from the multiple TRPs 110a, 110b are observed as different beams or transmissions with different transmission configuration indicator (TCI) states.

According to various aspects, there are different schemes that may be used for communication between the multi-TRP group and UE 120. For example, in some aspects, TRPs 110a, 110b may communicate with UE 120 according to a spatial division multiplexing (SDM) scheme in which TRPs 110a, 110b may use different spatial layers (e.g., different multiple input multiple output (MIMO) layers) to transmit the PDSCH in overlapping resource blocks (RBs) and/or symbols. In another example, TRPs 110a, 110b may communicate with UE 120 according to a time division multiplexing (TDM) scheme in which the multiple TRPs 110a, 110b transmit the PDSCH in different OFDM symbols, in different slots, and/or the like. In another example, TRPs 110, 110b may communicate with UE 120 according to a frequency division multiplexing (FDM) scheme in which the multiple TRPs 110a, 110b transmit the PDSCH in different RBs.

As further shown in FIG. 7, the PDCCH received from TRP$_1$ 110a may include or otherwise be associated with a single DCI message, which may include a frequency domain resource allocation (FDRA) field to indicate an aggregate RB allocation across multiple TCI states (e.g., across a first TCI state associated with TRP$_1$ 110a, a second TCI state associated with TRP$_2$ 110b, and/or the like). Accordingly, as shown by reference number 706, UE 120 may apply a frequency division multiplexing (FDM) scheme based on the RB allocation to receive RB sets associated with the multiple TCI states when the TRPs 110, 110b communicate with UE 120 according to the FDM scheme. For example, as shown by reference number 708, the FDM scheme in the illustrated example 700 includes two RB sets on the same OFDM symbols, labelled RB set 1 and RB set 2, and each TRP 110 transmits one of the RB sets. For example, TRP$_1$ 110a may transmit RB set 1 and TRP$_2$ 110b may transmit RB set 2, whereby each non-overlapping frequency resource allocation (e.g., RB set) may be associated with one TCI state. In general, the RB sets may have the same number of layers, the same set of demodulation reference signal (DMRS) ports, the same OFDM symbols, and/or the like. From the perspective of UE 120, there are two schemes that may be used to receive the two RB sets from TRPs 110*a*, 110*b*.

For example, in a first scheme as shown by reference number 710, there is one codeword 712 with one redundancy version (RV) used across an aggregate resource allocation. Accordingly, the UE 120 observes the one (large) codeword 712, and different coded bits in the codeword 712 are mapped to different RBs. For example, after UE 120 has demodulated the codeword 712, the demodulated codeword 712 is mapped first in frequency and then in time. In the first scheme shown by reference number 710, some of the coded bits in the demodulated codeword 712 are mapped to RB set 1 and some of the coded bits are mapped to RB set 2.

In some aspects, in a second scheme as shown by reference number 714, each RB set is associated with a different codeword of the same transport block (TB), with one RV used for each non-overlapping frequency resource allocation. For example, in FIG. 7, the second scheme includes a first codeword 716 and a second codeword 718 in the same circular buffer, which means that data in the circular buffer is encoded and different RVs are used to read the data out of the circular buffer. For the mapping to the RB sets, coded bits of the first codeword 716 are mapped to RB set 1 and the coded bits of the second codeword 718 are mapped to RB set 2.

Accordingly, from the perspective of UE 120, a particular TCI state generally applies to a particular RB set, and each TCI state may correspond to beam information, quasi co-location (QCL) information, and/or the like associated with a corresponding TRP 110. In some aspects, as described in more detail elsewhere herein, UE 120 may therefore determine a mapping from an FDRA indicated in the single DCI message to different TCI states that may be associated with different TRPs 110.

As indicated above, FIG. 7 is provided as an example. Other examples may differ from what is described with respect to FIG. 7.

Figure 8:
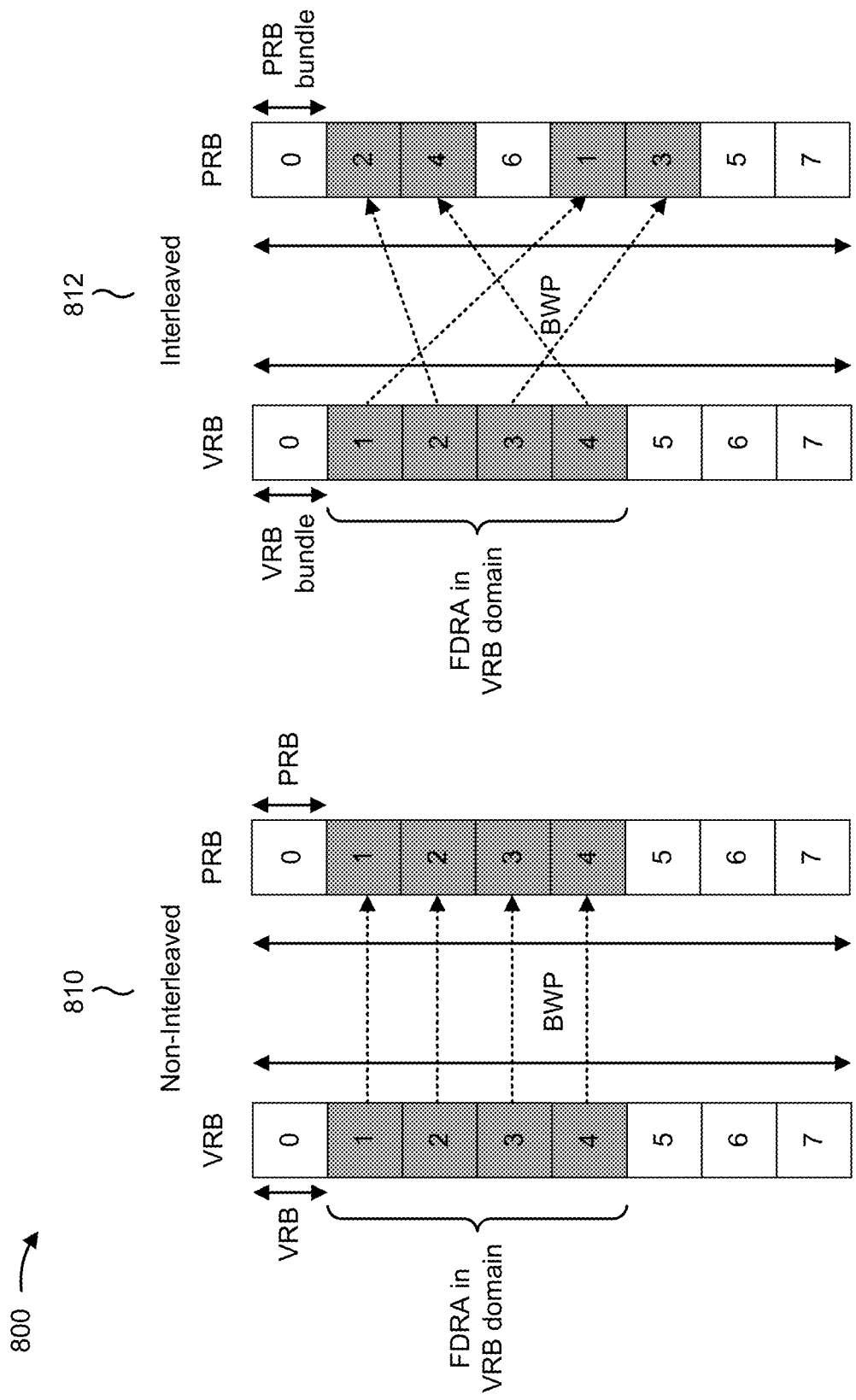
FIG. 8 is a diagram illustrating an example of a frequency domain resource allocation (FDRA), in accordance with various aspects of the present disclosure.

FIG. 8 is a diagram illustrating an example 800 of a frequency domain resource allocation (FDRA), in accordance with various aspects of the present disclosure. For example, in some aspects, the FDRA may be associated with a resource allocation type, which may be indicated in a parameter associated with a DCI message, a radio resource control (RRC) configuration, and/or the like. In general, the resource allocation type may include a first type (type 0) that is based on resource block groups (RBGs) or a second type (type 1) that is based on virtual resource blocks (VRBs) that are mapped to physical resource blocks (PRBs). Furthermore, the second type of resource allocation may include a first sub-type (without interleaving) and a second sub-type (with interleaving).

For example, when the resource allocation type is RBG-based (type 0), a total number of RBGs in a bandwidth part (BWP) may be denoted as N_RBG, in which case an FDRA field (e.g., in the DCI message scheduling the PDSCH, an RRC configuration message, and/or the like) may be a bitmap of size N_RBG indicating scheduled RBGs out of all N_RBG RBGs in the BWP. Each bit in the bitmap may be applied to one RBG. For example, a bitmap (or bit string) of '00110100000' may indicate that the third, fourth, and sixth RBGs are scheduled based on the third, fourth, and sixth bits having a value of one (1), and all other RBGs may be unscheduled based on the other bits having a value of zero (0). In some aspects, the RBG size, denoted by P, may generally refer to a quantity of RBs that can be included in one RBG, and P can be {2, 4, 8, 16} RBs depending on a BWP size, an RRC configuration, and/or the like.

In other examples, when the resource allocation is based on a mapping from a VRB domain to a PRB domain (type 1), the FDRA field effectively indicates a start RB in the VRB domain and a number of scheduled or allocated RBs in the VRB domain. Accordingly, because the scheduled or allocated RBs are always contiguous in the VRB domain, the aggregate FDRA in the VRB domain can be derived based on the start RB and the number of scheduled or allocated RBs. For example, as shown in FIG. 8, and by reference numbers 810 and 812, the FDRA field may indicate that the start RB is RB 1 and that the number of scheduled or allocated RBs is four. In this case, a UE can determine that the allocated RBs (in the VRB domain) includes RBs 1-4 based on the configuration whereby scheduled or allocated RBs are contiguous in the VRB domain.

Furthermore, in some aspects, the DCI message may include a VRB-PRB mapping field, which may be set to zero (0) to indicate that the VRB-PRB mapping is non-interleaved or set to one (1) to indicate that the VRB-PRB is interleaved. For example, in FIG. 8, reference number 810 illustrates the non-interleaved case, where VRBn is mapped to PRBn, which results in a mapping in which the PRBs are also contiguous because the VRBs are contiguous. In other words, when the VRB-PRB mapping is non-interleaved, the allocation of PRBs is equivalent to the allocation of VRBs. However, if the VRB-PRB mapping field is set to one (1), this may indicate that the PRBs are mapped to the VRBs according to a function f(.), in which case RB bundles are formed in the VRB domain and the PRB domain in a given BWP. Each RB bundle may have a particular size, L, which can be provided in a higher-layer parameter (e.g., a vrb-ToPRB-Interleaver parameter provided in an RRC configuration) and have a value of two or four RBs. Accordingly, as shown in FIG. 8, and by reference number 812, the allocated PRBs may be non-contiguous in the interleaved case, with VRB bundle j mapped to PRB bundle f(j) based on the function f(.). However, in cases where the FDRA schedules or otherwise allocates all of the available VRB bundles in the BWP, then all available PRBs in the BWP are also scheduled or otherwise allocated. In this case, the PRBs may appear to be contiguous even though the interleaving function is still used to map the scheduled VRB bundles to the PRB bundles.

As indicated above, FIG. 8 is provided as an example. Other examples may differ from what is described with respect to FIG. 8.

Figure 9A:
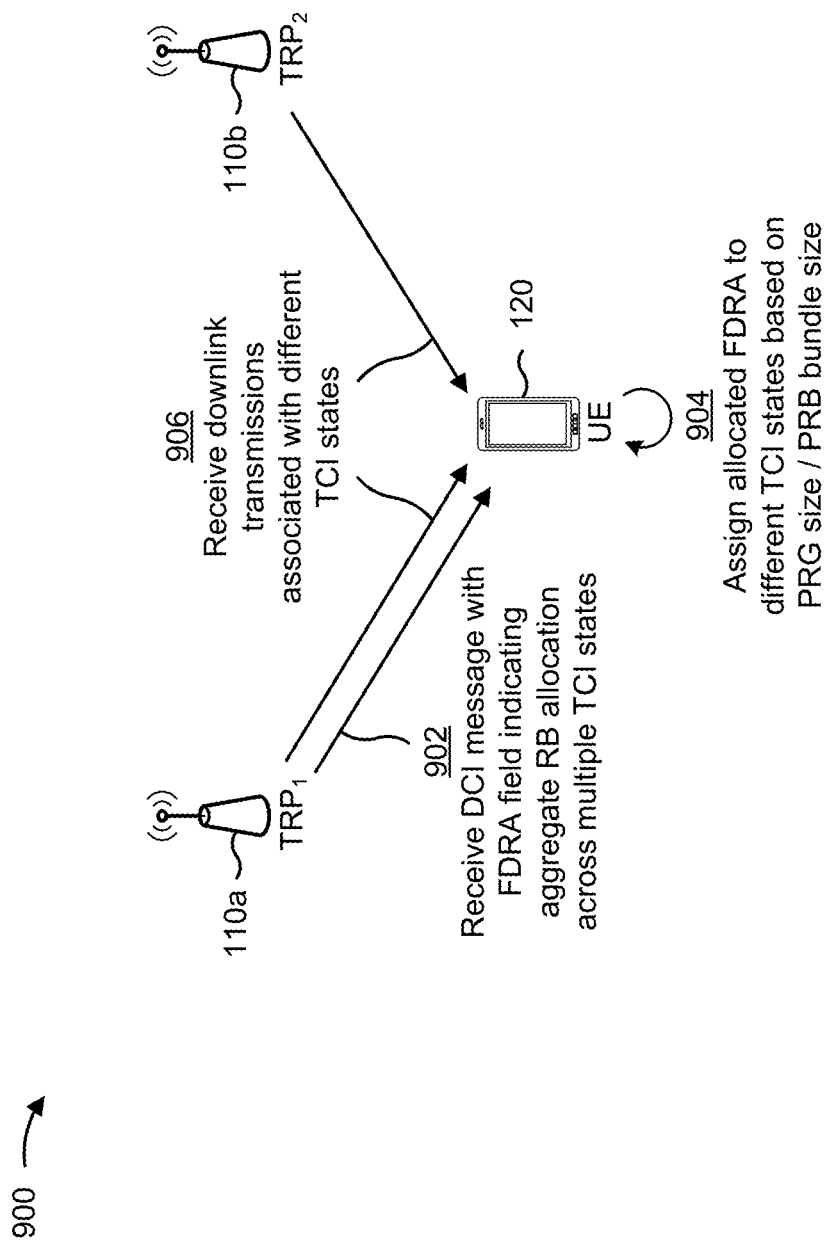
FIGS. 9A-9B are diagrams illustrating an example of a multi-TRP communication in which a UE assigns an allocated FDRA indicated in a single DCI message to different transmission configuration indication (TCI) states based on a size associated with a precoding resource block group (PRG) and/or a physical resource block (PRB) bundle, in accordance with various aspects of the present disclosure.
Figure 9B:
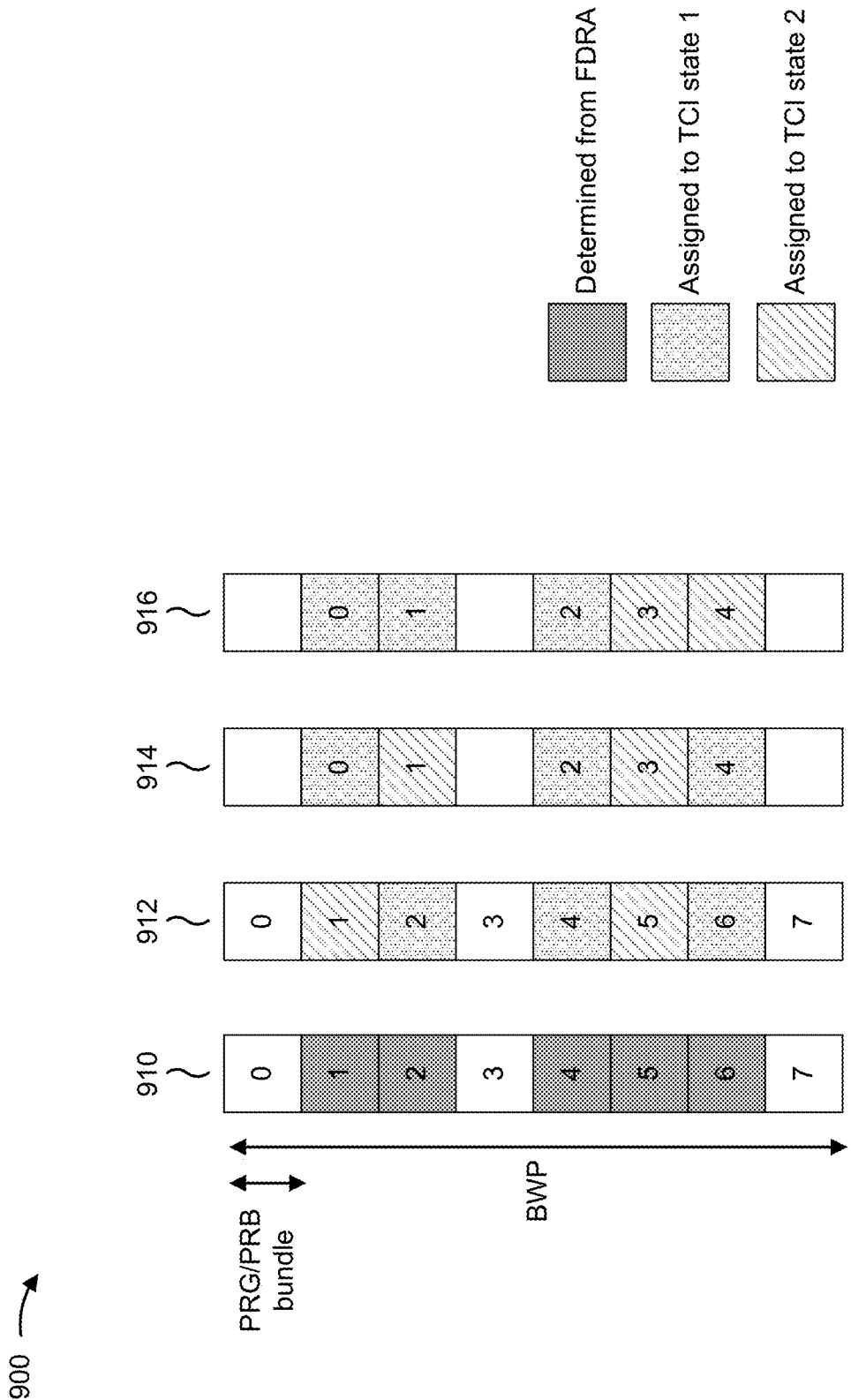

FIGS. 9A-9B are diagrams illustrating an example 900 of a multi-TRP communication in which a UE assigns an allocated FDRA indicated in a single DCI message to different TCI states based on a size associated with a precoding resource block group (PRG) and/or a PRB bundle, in accordance with various aspects of the present disclosure. In particular, as used herein, the terms PRG, PRB bundle, and/or the like may interchangeably refer to a unit of contiguous RBs (in a PRB domain) over which a UE can assume that the same precoding is used; hence, PRGs, PRB bundles, and/or the like can be used as a unit for joint channel estimation.

Accordingly, as shown in FIG. 9A, and by reference number 902, UE 120 may receive, from one TRP in a multi-TRP group, a DCI message with an FDRA field that indicates an aggregate RB allocation across multiple TCI states. For example, there are two TRPs 110*a*, 110*b* in example 900, whereby the DCI message received from TRP 110a may indicate an aggregate RB allocation across a first TCI state associated with TRP 110a and a second TCI state associated with TRP 110b. Furthermore, in some aspects, the DCI message may include a PRB bundling size indicator field in cases where one or more higher layer parameters (e.g., a prb-BundlingType parameter) are set to 'dynamic' or otherwise enable the PRG and/or PRB bundling size to be changeable by the DCI message. For example, the PRB bundling size indicator may be a one-bit value that can be used to determine a PRG and/or PRB bundling size, P', which can be equal to one of the values among {2, 4, wideband}. Additionally, or alternatively, if the higher layer parameters do not enable the PRG and/or PRB bundling size to be changeable by the DCI message, then the value of P' may be semi-statically indicated through an RRC configuration (e.g., P' may have a value fixed to one of {2, 4, wideband}).

As further shown in FIG. 9A, and by reference number 904, UE 120 may determine the aggregate RB allocation across the multiple TCI states from the FDRA field in the DCI message, and assign allocated RBs, PRGs, PRB bundles, and/or the like to respective TCI states based on the PRG and/or PRB bundling size, P'. For example, where P' is semi-statically indicated, UE 120 may determine the value based on the fixed value indicated in the RRC configuration. In other examples, where the DCI message includes a PRB bundling size indicator field to dynamically indicate and/or change the PRG and/or PRB bundling size, UE 120 may determine the value of P' based on various rules associated with the PRB bundling size indicator field.

For example, if P'=4 RBs, the RBG size (P) for resource allocation type 0 cannot be 2, as the 4 RBs making up the unit of channel estimation cannot be grouped into a bitmap with only two RBs (i.e., the bitmap would need at least four RBs). The same rule applies to the RB bundle size, L, used for resource allocation type 1 with interleaving, as interleaving cannot be performed with an interleaving unit equal to 2 RBs when the PRG size is equal to 4 RBs. However, the opposite is true, in that P' can be 2 if the RBG size or the RB bundle size is 4. Accordingly, one condition may be that the RBG size and/or the RB bundle size are larger than the PRG and/or PRB bundling size, and another condition may be that the RBG size and/or RB bundle size is a multiple of the PRG and/or PRB bundling size (e.g., in cases where P' is 2 or 4). Furthermore, if P'=wideband, then the allocated PRBs should be contiguous to allow for wideband channel estimation. This is because UE 120 assumes that the same precoding is applied to all the PDSCH RBs, whereby the allocated PRBs should be contiguous (e.g., because the same precoding cannot be assumed for non-contiguous RBs). In some aspects, the condition whereby a wideband PRG and/or PRB bundling size is coupled with contiguous RBs is applicable in environments in which there is only one TCI state across all RBs. For multi-TRP environments that use an FDM scheme with a wideband PRG and/or PRB bundling size, RBs per TCI state should be contiguous, as different precoding is generally used when there are different TCI states.

Accordingly, in some aspects, UE 120 may use the PRG and/or PRB bundling size to determine how to divide the aggregate RB allocation indicated in the DCI message among multiple RB sets that correspond to different TCI states. For example, as further shown in FIG. 9A, and by reference number 906, UE 120 may receive downlink transmissions from multiple TRPs 110a, 110b, which may be associated with different TCI states. In this way, by using the PRG and/or PRB bundling size to divide the aggregate RB allocation indicated in FDRA field of the DCI message among multiple RB sets that correspond to different TCI states, UE 120 may correctly process the downlink transmissions that are associated with the different TCI states.

For example, in cases where UE 120 determines that the PRG and/or PRB bundling size is "wideband", the assignment of allocated RBs to respective TCI states may depend on whether the allocated PRBs are contiguous. In cases where the allocated PRBs are contiguous, the allocated RBs may be divided into n sets that include an equal or approximately equal number of the allocated RBs and each of the n sets may be assigned to a respective one of the individual TCI states, where n is a quantity of the individual TCI states. For example, in FIG. 9A, the multi-TRP group includes two TRPs 110a, 110b, whereby a first half of the allocated RBs ($[N_{RB}/2]$) are assigned to a first TCI state associated with TRP 110a, and a second half of the allocated RBs ($[N_{RB}/2]$) are assigned to a second TCI state associated with TRP 110b, where $N_{RB}$ is a quantity of allocated RBs indicated in the FDRA field of the DCI message. In such cases, one or more ceiling and/or floor operations are used to ensure that a number of RBs in each set is an integer value (e.g., because allocated RBs are non-overlapping in FDM schemes and therefore cannot be assigned in fractional values). For example, where the FDRA field allocates 5 RBs, RBG, PRGs, RB bundles, and/or the like among two TCI states, a half/half split using the ceiling and floor operations may result in 3 sets being assigned to one TCI state and 2 sets being assigned to the other TCI state.

In other examples, where the PRG and/or PRB bundling size is "wideband" and the allocated PRBs are not contiguous but include multiple contiguous parts, then each contiguous part may be assigned to a respective TCI. For example, if the allocated PRBs include two contiguous parts, UE 120 may assign a first contiguous part to the first TCI state associated with TRP 110a and assign a second contiguous part to the second TCI state associated with TRP 110b.

In some aspects, when UE 120 determines that the PRG and/or PRB bundling size is a value other than "wideband" (e.g., 2 or 4), allocated PRGs, PRB bundles, and/or the like may be determined based on the FDRA field, PRG size, BWP size, location, and/or the like. For example, as shown in FIG. 9B, and by reference number 910, a BWP may include n PRGs, PRB bundles, and/or the like, which may be associated with indices (i) from $0 \leq i \leq n-1$. As further shown by reference number 910, UE 120 may determine (e.g., based on the FDRA field) that PRGs and/or PRB bundles associated with indices 1, 2, 4, 5, and 6 are allocated, where each PRG and/or PRB bundle includes two or four RBs depending on the PRG and/or PRB bundling size.

In some aspects, UE 120 may determine a scheme to be used to divide the allocated PRGs, PRB bundles, and/or the like based on a dynamic indicator included in the DCI message, a higher-layer RRC configuration, and/or the like. In some aspects, the scheme may include assigning an index to each individual PRG among the allocated PRGs and mapping the index assigned to each individual PRG to a respective one of the individual TCI states according to a function that is based at least in part on a quantity of the individual TCI states. For example, when there are two individual TCI states, this function may result in PRGs that are associated with even indices being assigned to the first TCI state associated with TRP 110a, and PRGs that are associated with odd indices being assigned to the second TCI state associated with TRP 110b. More generally, the function may be based on a modulo operator that causes a set of PRGs that are assigned a particular index to be mapped to a particular TCI state when dividing the particular index by the quantity of the individual TCI states results in a remainder that equals the particular index. For example, a PRG associated with a particular index number may be assigned to TCI state i when the particular index number mod n is equal to i, where n is the quantity of the individual TCI states.

In some aspects, the allocated PRGs, PRB bundles, and/or the like may be indexed with respect to an entire bandwidth part. For example, as further shown in FIG. 9B, and by reference number 912, the PRG indices cover the entire bandwidth part, PRGs associated with even indices are assigned to the first TCI state associated with TRP 110a, and PRGs associated with odd indices are assigned to the second TCI state associated with TRP 110b. In other examples, as shown by reference number 914, PRG indexing may be performed with respect to only the allocated RBs (e.g., PRGs are re-indexed starting from 0 within the allocated RBs), and PRGs associated with even indices are similarly assigned to the first TCI state while PRGs associated with odd indices are assigned to the second TCI state.

In some aspects, the scheme used to divide the allocated PRGs, PRB bundles, and/or the like may be similar to the approach described above in cases where the PRG size is wideband and the allocated PRBs are contiguous, except that the units may be in terms of PRGs and/or PRB bundles rather than RBs. In particular, the allocated PRGs, PRB bundles, and/or the like may be divided into n sets that include an equal or approximately equal number of the allocated PRGs, PRB bundles, and/or the like, and each of the n sets may be assigned to a respective one of the individual TCI states, where n is a quantity of the individual TCI states. For example, as shown in FIG. 9B, and by reference number 916, a first half of the allocated PRGs are assigned to the first TCI state and a second half of the allocated PRGs are assigned to the second TCI state based on one or more ceiling and/or floor operations.

As indicated above, FIGS. 9A-9B are provided as an example. Other examples may differ from what is described with respect to FIGS. 9A-9B.

FIGS. 10A-10E are diagrams illustrating an example 1000 of a multi-TRP communication in which a UE assigns an allocated FDRA indicated in a single DCI message to different TCI states based on a resource allocation type, in accordance with various aspects of the present disclosure. For example, as mentioned above, a resource allocation type may be RBG-based (type 0), based on a non-interleaved VRB-to-PRB mapping (type 1 without interleaving), or based on an interleaved VRB-to-PRB mapping (type 1 with interleaving). Accordingly, in some aspects, as shown by reference number 1004, UE 120 may assign the allocated RBs indicated in the FDRA field to different TCI states based on the resource allocation type.

Figure 10A:
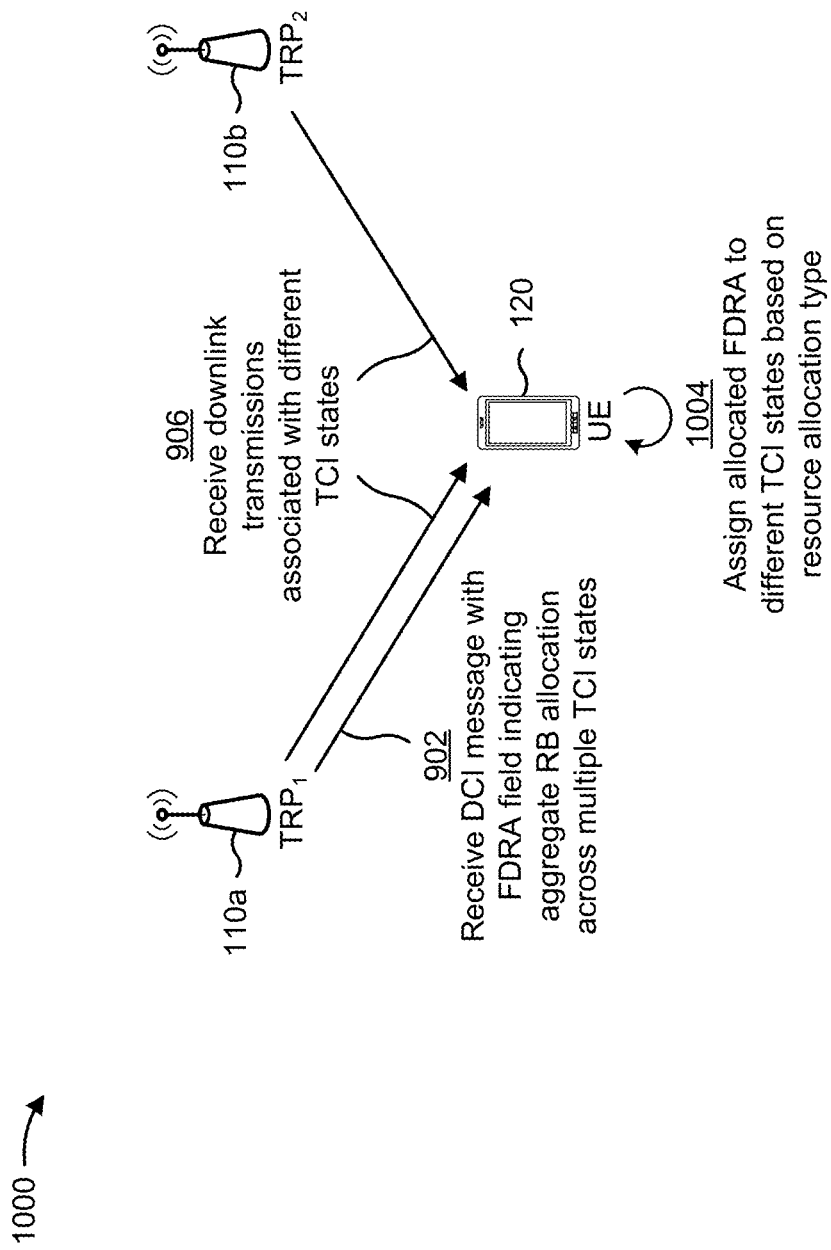
FIGS. 10A-10E are diagrams illustrating an example of a multi-TRP communication in which a UE assigns an allocated FDRA indicated in a single DCI message to different TCI states based on a resource allocation type, in accordance with various aspects of the present disclosure.
Figure 10B:
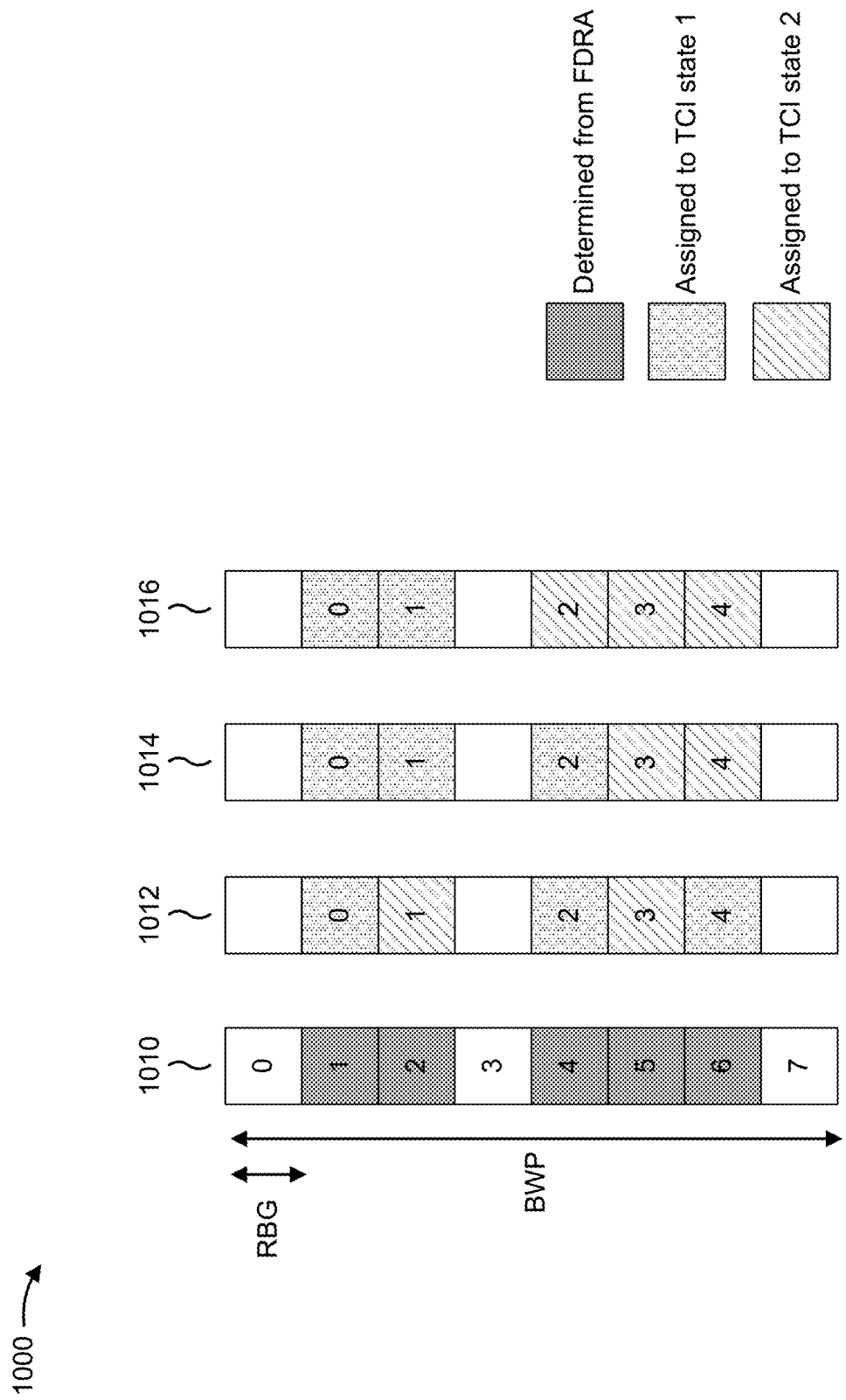

For example, FIG. 10B illustrates various assignment schemes that may be applied when the resource allocation type is RBG-based (type 0). As shown by reference number 1010, an example bandwidth part may include 8 RBGs, and each RBG may have a size, P, that can be {2, 4, 8, 16} RBs. In the illustrated example, the FDRA field in the DCI message indicates that RBGs 1, 2, 4, 5, and 6 are allocated, and various approaches can be used to assign the allocated RBGs to different TCI states. For example, as shown by reference number 1012, allocated RBGs can be indexed (e.g., within the bandwidth part or within only the allocated RBGs) and each index may be mapped to a respective TCI state according to a function that is based at least in part on a quantity of the individual TCI states. For example, where there are two TCI states, the function may result in a mapping whereby RBGs with an even index are assigned to the first TCI state and RBGs with an odd index are assigned to the second TCI state.

Additionally, or alternatively, the allocated RBGs can be divided into multiple sets that include an equal or approximately equal quantity of RBGs, and each set may be assigned to a respective TCI state. For example, as shown by reference number 1014, the allocated RBGs may be divided into two sets when there are two TCI states, with a first half of the allocated RBGs assigned to the first TCI state and a second half of the allocated RBGs assigned to the second TCI state. In this case, floor and ceiling operations are used in a similar manner as described elsewhere herein when dividing the allocated RBGs into the multiple sets. Additionally, or alternatively, in cases where the PRG size is determined to be wideband and the allocated RBGs are not contiguous but include a number of contiguous parts that equals the number of TCI states, then each contiguous part may be assigned to a respective TCI state. For example, the allocated RBGs shown by reference number 1010 include a first contiguous part (RBGs 1-2) and a second contiguous part (RBGs 4-6) that are not contiguous with respect to one another (i.e., the aggregate RBG allocation is not contiguous). Accordingly, as shown by reference number 1016, the first contiguous part may be assigned to the first TCI state and the second contiguous part may be assigned to the second TCI state.

In some aspects, the particular assignment scheme to be applied when the resource allocation type is RBG-based (type 0) may be determined based on a higher-layer RRC configuration, indicated dynamically in the DCI message, and/or based on a function of PRG size. For example, in some aspects, UE 120 may divide the allocated RBGs into multiple sets that include an equal or approximately equal quantity of RBGs when the PRG size is wideband, and otherwise use the indexing scheme when the PRG size is a value other than wideband (e.g., 2 or 4).

Figure 10C:
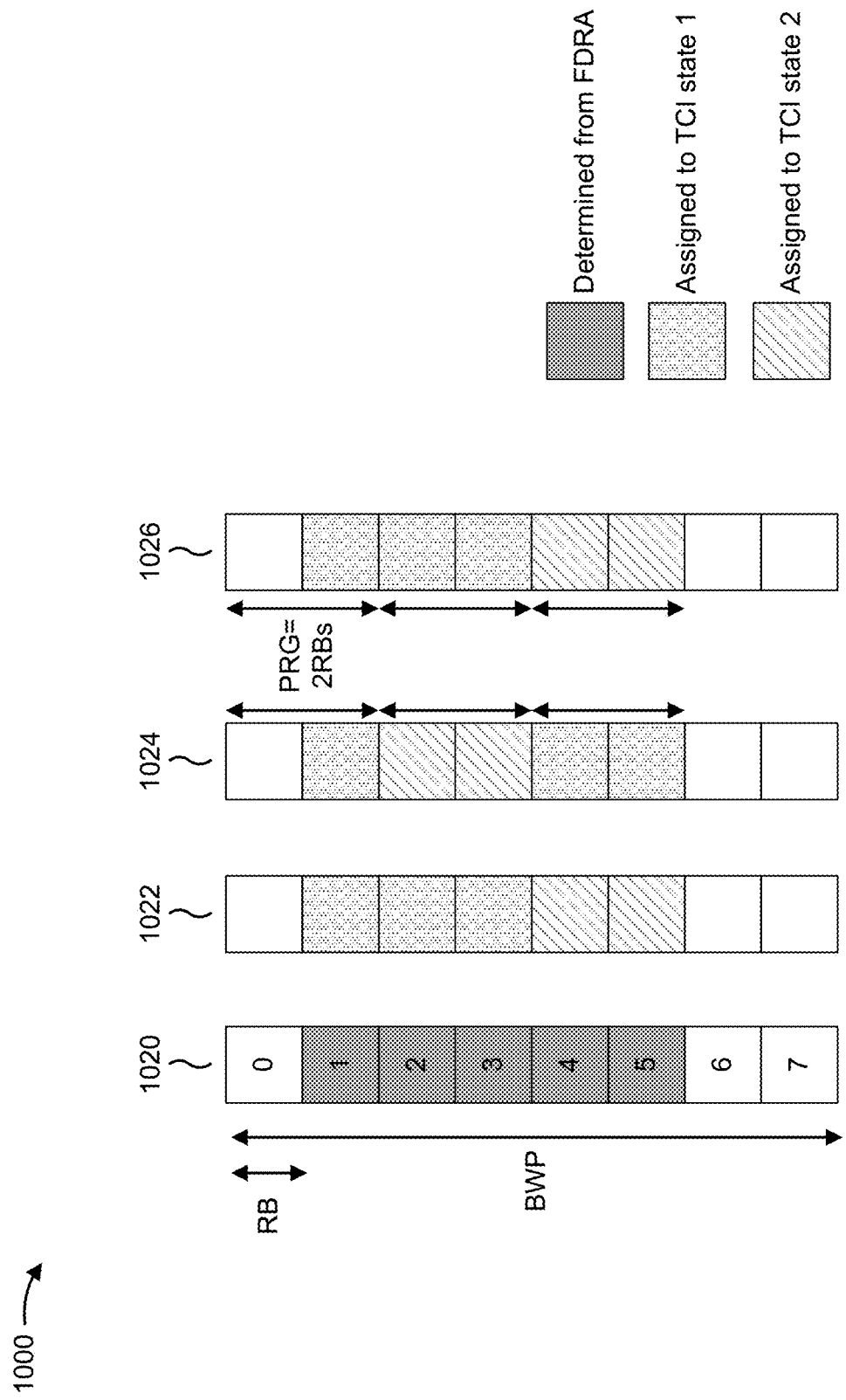

In other examples, FIG. 10C illustrates various assignment schemes that may be applied when the resource allocation type is based on a non-interleaved VRB-to-PRB mapping and the parameter L for an RB bundle size is not configured. In such non-interleaved cases, as mentioned elsewhere herein, the VRB allocation is the same as the PRB allocation and both are contiguous. For example, as shown by reference number 1020, a bandwidth part includes 8 RBs and the allocated VRBs and/or PRBs are contiguous, spanning RBs 1-5. With respect to the mapping to TCI states, different approaches may be used based on the PRG size, which may result in a mapping that is similar to that described in further detail above with respect to FIGS. 9A-9B. For example, reference number 1022 illustrates the case where the PRG size is wideband, which results in a split of two halves according to an RB unit, with a first half assigned to the first TCI state and a second half assigned to the second TCI state. As mentioned elsewhere herein, splitting or otherwise dividing the allocated RBs into sets with an equal or approximately number of RBs may be performed using one or more ceiling and/or floor operations.

In other examples, where the PRG size is a value other than "wideband" (e.g., 2 or 4), an indexing scheme may be used, and the indexing scheme may take a PRG alignment into account for assigning RBs to the first TCI state and the second TCI state. For example, as shown by reference number 1024, one PRG may include 2 RBs, whereby a first two RBs in the bandwidth part may be assigned an index of 0, the next two RBs in the bandwidth part may be assigned an index of 1, and/or the like. As mentioned elsewhere herein, the indices may be assigned with respect to the entire bandwidth part or only with respect to the allocated RBs. In the illustrated example, where there are two TCI states, this scheme may result in the assignment shown by reference number 1024, where RBs that map to PRGs with an even index are assigned to the first TCI state, and RBs that map to PRGs with an odd index are assigned to the second TCI state. Additionally, or alternatively, as shown by reference number 1026, the allocated RBs may be grouped into sets based on the PRG size (e.g., each set including two RBs based on a PRG size of 2), and a first half of the RBs are assigned to the first TCI state and a second half of the RBs are assigned to the second TCI state.

Figure 10D:
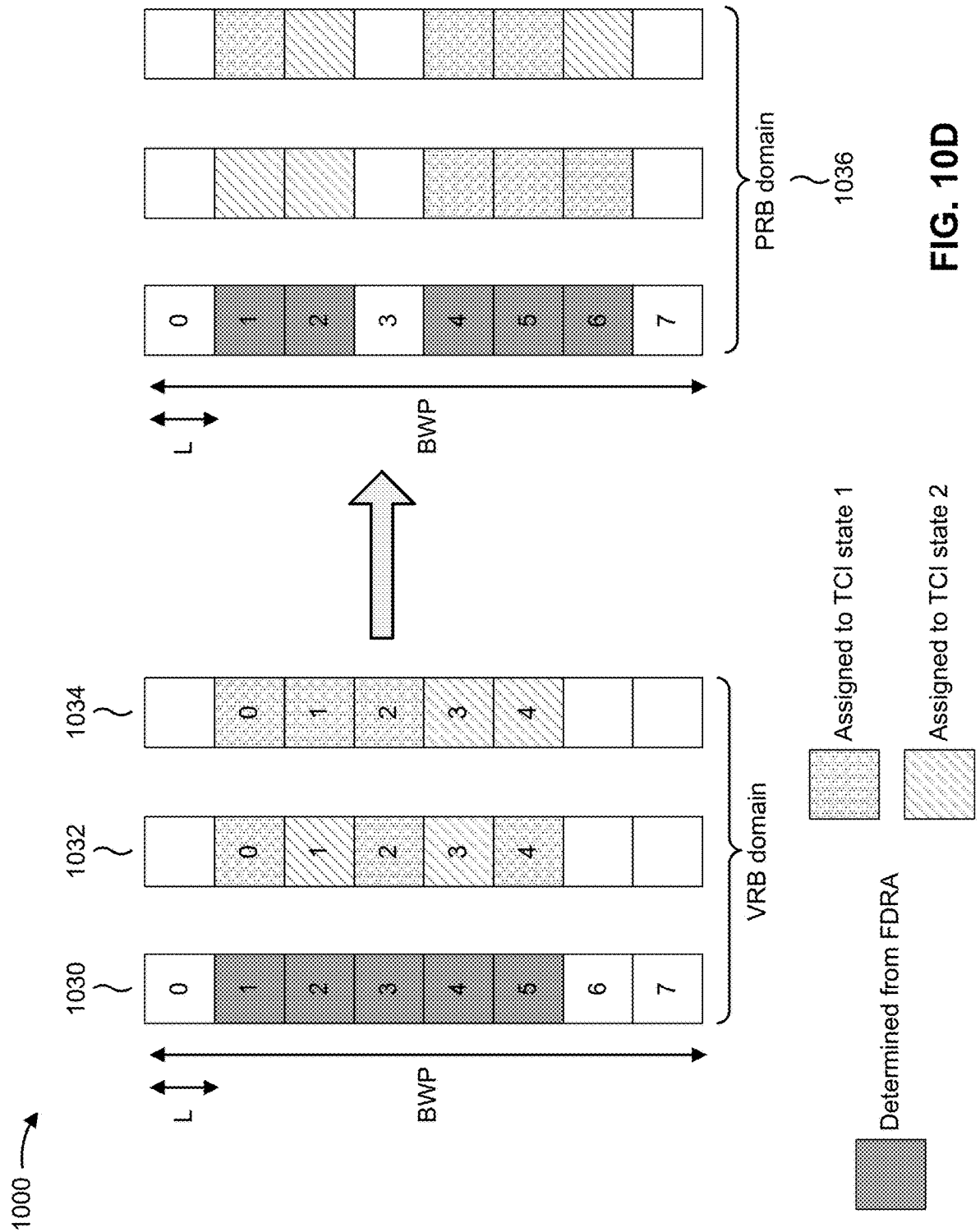
Figure 10E:
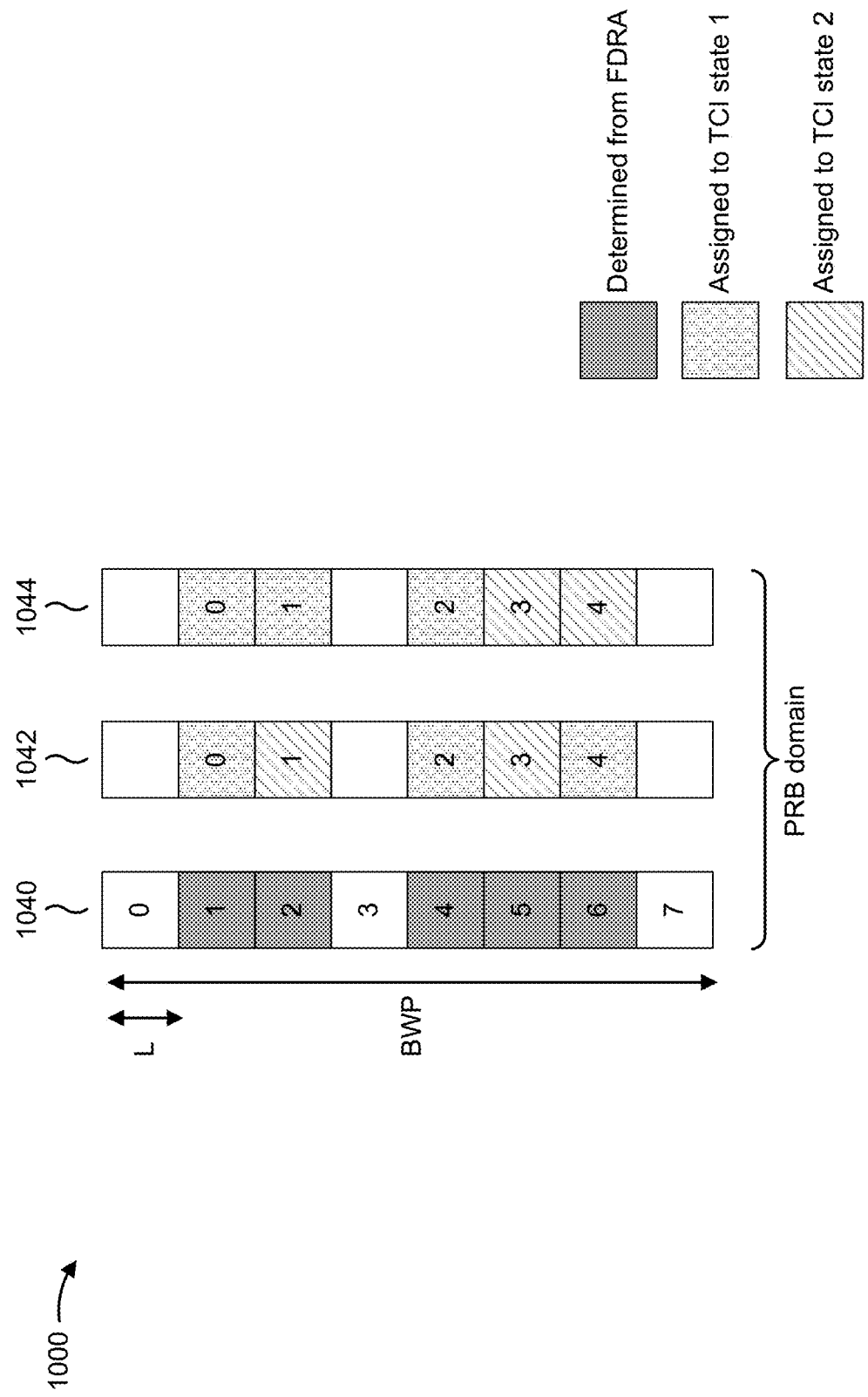

In other examples, FIGS. 10D-10E illustrate various assignment schemes that may be applied when the resource allocation type is based on an interleaved VRB-to-PRB mapping or a non-interleaved VRB-to-PRB mapping in cases where the RB bundle size parameter, L, is configured and used for the purpose of assigning allocated RBs to respective TCI states. For example, in some aspects, the RB bundle size, L, may be determined from a parameter provided in an RRC configuration (e.g., a vrb-ToPRB-Interleaver parameter). Accordingly, in some aspects, even RB bundles may be assigned to the first TCI state and odd RB bundles may be assigned to the second TCI state, with indexing to determine even/odd performed based on an RB bundle index within a bandwidth part or within allocated RBs only, or half of the allocated RB bundles may be assigned to the first TCI state and the other half assigned to the second TCI state. As mentioned elsewhere herein, these examples are described in a context of a multi-TRP group including two TRPs (associated with two TCI states), and in some aspects, the assignment schemes may be generalized to cases where there are n TCI states (e.g., dividing the allocated RB bundles into n sets that have an equal or approximately equal quantity of RB bundles, performing the indexing based on a modulo operator or other function, and/or the like). Furthermore, the particular assignment scheme to be applied may be determined based on a higher-layer RRC configuration, indicated dynamically in the DCI message, and/or based on PRG size.

In some aspects, the various assignment schemes that map RB bundles to the respective TCI states can be performed in a VRB domain (e.g., VRB indices are used) or in a PRB domain (e.g., PRB indices are used). For example, in FIG. 10D, reference number 1030 illustrates allocated RB bundles determined from the FDRA field in the DCI message in the VRB domain, reference number 1032 illustrates a mapping in which RB bundles with an even index are assigned to the first TCI state and RB bundles with an odd index are assigned to the second TCI state, and reference number 1034 illustrates a mapping in which a first half of allocated RB bundles are assigned to the first TCI state and a second half of the allocated RB bundles are assigned to the second TCI state. As further shown in FIG. 10D, and by reference number 1036, the assignment of the allocated RB bundles may then be translated to the PRB domain based on the applicable interleaving function.

Additionally, or alternatively, the RB bundles may be mapped to the respective TCI states directly in the PRB domain. For example, as shown in FIG. 10E, reference number 1040 illustrates allocated RB bundles (e.g., as determined from the FDRA field) in the PRB domain, reference number 1042 illustrates a mapping in which RB bundles with an even index are assigned to the first TCI state and RB bundles with an odd index are assigned to the second TCI state, and reference number 1044 illustrates a mapping in which a first half of allocated RB bundles are assigned to the first TCI state and a second half of the allocated RB bundles are assigned to the second TCI state.

As indicated above, FIGS. 10A-10E are provided as examples. Other examples may differ from what is described with respect to FIGS. 10A-10E.

Figure 11:
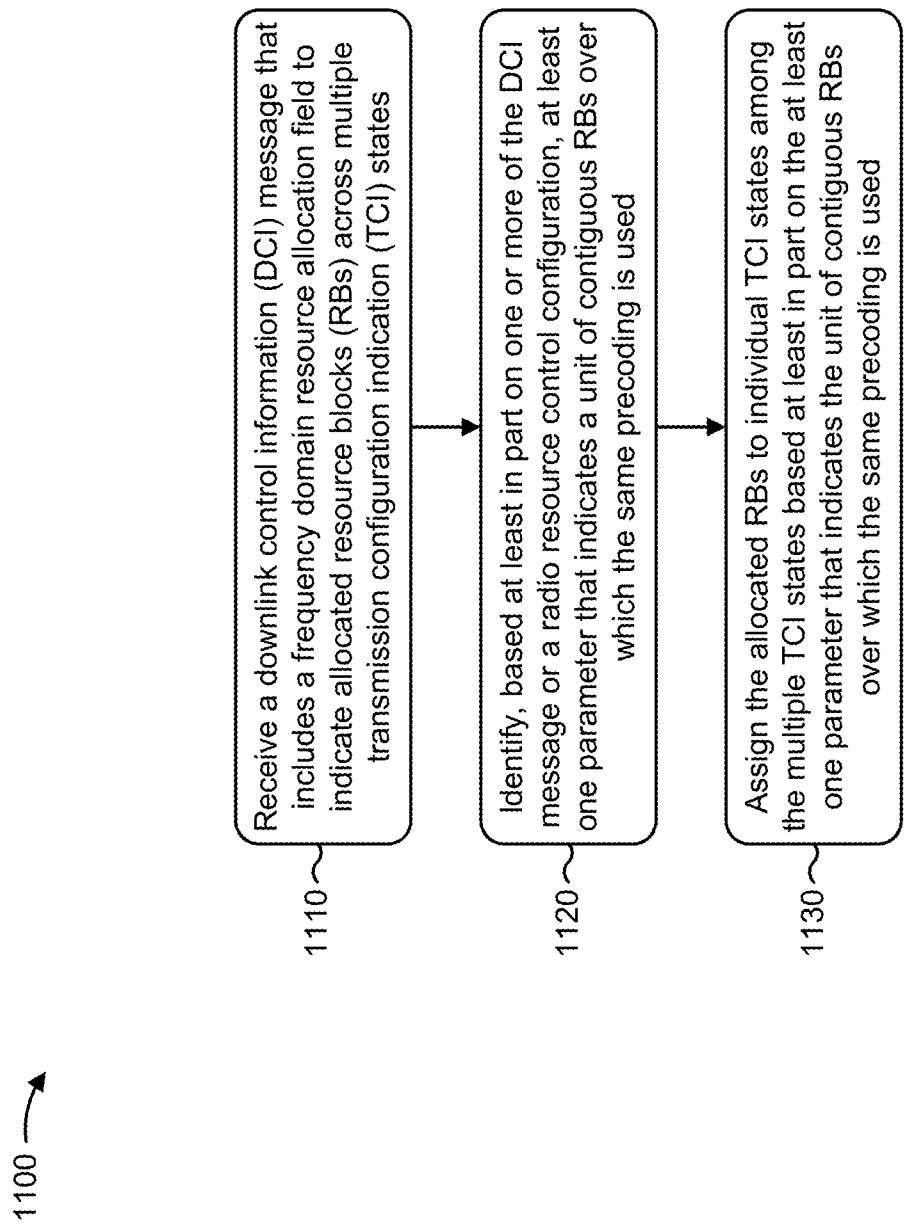

FIG. 11 is a diagram illustrating an example process 1100 performed, for example, by a UE, in accordance with various aspects of the present disclosure. Example process 1100 is an example where a UE (e.g., UE 120 and/or the like) assigns an FDRA indicated in a single DCI message to multiple TCI states based on a PRG size, a PRB bundle size, and/or another unit of contiguous RBs over which the same precoding is used (e.g., to enable joint channel estimation).

As shown in FIG. 11, in some aspects, process 1100 may include receiving a DCI message that includes an FDRA field to indicate allocated RBs across multiple TCI states (block 1110). For example, the UE (e.g., using antenna 252, DEMOD 254, MIMO detector 256, receive processor 258, controller/processor 280, memory 282, and/or the like) may receive a DCI message that includes an FDRA field to indicate allocated RBs across multiple TCI states, as described above.

As further shown in FIG. 11, in some aspects, process 1100 may include identifying, based at least in part on one or more of the DCI message or an RRC configuration, at least one parameter that indicates a unit of contiguous RBs over which the same precoding is used (block 1120). For example, the UE (e.g., using receive processor 258, transmit processor 264, controller/processor 280, memory 282, and/or the like) may identify, based at least in part on one or more of the DCI message or an RRC configuration, at least one parameter that indicates a unit of contiguous RBs over which the same precoding is used, as described above.

As further shown in FIG. 11, in some aspects, process 1100 may include assigning the allocated RBs to individual TCI states among the multiple TCI states based at least in part on the at least one parameter that indicates the unit of contiguous RBs over which the same precoding is used (block 1130). For example, the UE (e.g., using receive processor 258, transmit processor 264, controller/processor 280, memory 282, and/or the like) may assign the allocated RBs to individual TCI states among the multiple TCI states based at least in part on the at least one parameter that indicates the unit of contiguous RBs over which the same precoding is used, as described above.

Process 1100 may include additional aspects, such as any single aspect or any combination of aspects described below and/or in connection with one or more other processes described elsewhere herein.

In a first aspect, the at least one parameter includes one or more of a PRG size or a PRB bundle size.

In a second aspect, alone or in combination with the first aspect, assigning the allocated RBs to the individual TCI states includes dividing the allocated RBs into n sets that include an equal or approximately equal number of the allocated RBs based at least in part on determining that the allocated RBs are contiguous and the unit of contiguous RBs over which the same precoding is used is wideband, where n is a quantity of the individual TCI states, and assigning each of the n sets to a respective one of the individual TCI states.

In a third aspect, alone or in combination with one or more of the first and second aspects, the equal or approximately equal number of the allocated RBs to include in the n sets is determined using one or more ceiling operations and one or more floor operations based at least in part on a total quantity of the allocated RBs and the quantity of the individual TCI states.

In a fourth aspect, alone or in combination with one or more of the first through third aspects, the unit of contiguous RBs with the same precoding is wideband per TCI state for an FDM scheme with the multiple TCI states.

In a fifth aspect, alone or in combination with one or more of the first through fourth aspects, the allocated RBs are contiguous within the n sets.

In a sixth aspect, alone or in combination with one or more of the first through fifth aspects, assigning the allocated RBs to the individual TCI states includes determining that the allocated RBs are not contiguous but include n contiguous parts, and that the unit of contiguous RBs over which the same precoding is used is wideband, where n is a quantity of the individual TCI states, and assigning each of the n contiguous parts to a respective one of the individual TCI states.

In a seventh aspect, alone or in combination with one or more of the first through sixth aspects, the allocated RBs include allocated PRGs that are assigned to the individual TCI states according to a scheme that is determined based at least in part on one or more of a dynamic indicator included in the DCI message or the RRC configuration based at least in part on determining that the unit of contiguous RBs over which the same precoding is used is a value other than wideband.

In an eighth aspect, alone or in combination with one or more of the first through seventh aspects, the scheme includes assigning an index to each individual PRG among the allocated PRGs based at least in part on an indication in the FDRA field, and the index assigned to each individual PRG is mapped to a respective one of the individual TCI states according to a function that is based at least in part on a quantity of the individual TCI states.

In a ninth aspect, alone or in combination with one or more of the first through eighth aspects, the function causes a first set of PRGs that are assigned even indices to be mapped to a first TCI state and causes a second set of PRGs that are assigned odd indices to be mapped to a second TCI state when the quantity of the individual TCI states is two.

In a tenth aspect, alone or in combination with one or more of the first through ninth aspects, the function is a modulo operator that causes a set of PRGs that are assigned a particular index to be mapped to a particular TCI state when dividing the particular index by the quantity of the individual TCI states results in a remainder that equals the particular index.

In an eleventh aspect, alone or in combination with one or more of the first through tenth aspects, the index assigned to each PRG is determined with respect to an entire bandwidth part.

In a twelfth aspect, alone or in combination with one or more of the first through eleventh aspects, the index assigned to each PRG is determined with respect to only the allocated RBs indicated in the FDRA field.

In a thirteenth aspect, alone or in combination with one or more of the first through twelfth aspects, the scheme includes dividing the allocated PRGs into n sets that include an equal or approximately equal number of the allocated PRGs, where n is a quantity of the individual TCI states, and assigning each of the n sets to a respective one of the individual TCI states.

In a fourteenth aspect, alone or in combination with one or more of the first through thirteenth aspects, the equal or approximately equal number of the allocated RBs to include in the n sets is determined using one or more ceiling operations and one or more floor operations based at least in part on a total quantity of the allocated RBs and the quantity of the individual TCI states.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

FIG. 12 is a diagram illustrating an example process 1200 performed, for example, by a UE, in accordance with various aspects of the present disclosure. Example process 1200 is an example where a UE (e.g., UE 120) assigns an FDRA indicated in a single DCI message to multiple TCI states based on a resource allocation type (e.g., depending on whether the resource allocation is RBG-based, VRB-based without interleaving, VRB-based with interleaving, and/or the like).

As shown in FIG. 12, in some aspects, process 1200 may include receiving a DCI message that includes an FDRA field to indicate allocated RBs across multiple TCI states (block 1210). For example, the UE (e.g., using antenna 252, DEMOD 254, MIMO detector 256, receive processor 258, controller/processor 280, memory 282, and/or the like) may receive a DCI message that includes an FDRA field to indicate allocated RBs across multiple TCI states, as described above.

As further shown in FIG. 12, in some aspects, process 1200 may include identifying, based at least in part on one or more of the DCI message or an RRC configuration, at least one parameter that indicates a resource allocation type (block 1220). For example, the UE (e.g., using receive processor 258, transmit processor 264, controller/processor 280, memory 282, and/or the like) may identify, based at least in part on one or more of the DCI message or an RRC configuration, at least one parameter that indicates a resource allocation type, as described above.

As further shown in FIG. 12, in some aspects, process 1200 may include assigning the allocated RBs to individual TCI states among the multiple TCI states based at least in part on the resource allocation type (block 1230). For example, the UE (e.g., using receive processor 258, transmit processor 264, controller/processor 280, memory 282, and/or the like) may assign the allocated RBs to individual TCI states among the multiple TCI states based at least in part on the resource allocation type, as described above.

Process 1200 may include additional aspects, such as any single aspect or any combination of aspects described below and/or in connection with one or more other processes described elsewhere herein.

In a first aspect, assigning the allocated RBs to the individual TCI states includes assigning an index to each individual RBG allocated in the FDRA field based at least in part on determining that the resource allocation type is RBG-based, and the index assigned to each individual RBG is mapped to a respective one of the individual TCI states according to a function that is based at least in part on a quantity of the individual TCI states.

In a second aspect, alone or in combination with the first aspect, the function causes a first set of RBGs that are assigned even indices to be mapped to a first TCI state and causes a second set of RBGs that are assigned odd indices to be mapped to a second TCI state when the quantity of the individual TCI states is two.

In a third aspect, alone or in combination with one or more of the first and second aspects, the function is a modulo operator that causes a set of RBGs that are assigned a particular index to be mapped to a particular TCI state when dividing the particular index by the quantity of the individual TCI states results in a remainder that equals the particular index.

In a fourth aspect, alone or in combination with one or more of the first through third aspects, the index assigned to each individual RBG is determined with respect to one or more of RBGs in an entire bandwidth part or only a set of RBGs that are allocated in the FDRA field.

In a fifth aspect, alone or in combination with one or more of the first through fourth aspects, assigning the allocated RBs to the individual TCI states includes dividing allocated RBGs into n sets that include an equal or approximately equal number of the allocated RBGs, based at least in part on determining that the resource allocation type is RBG-based and that a unit of contiguous RBs over which the same precoding is used is a value other than wideband, where n is a quantity of the individual TCI states, and assigning each of the n sets to a respective one of the individual TCI states.

In a sixth aspect, alone or in combination with one or more of the first through fifth aspects, the equal or approximately equal number of the allocated RBGs to include in the n sets is determined using one or more ceiling operations and one or more floor operations based at least in part on a total quantity of the allocated RBGs and the quantity of the individual TCI states.

In a seventh aspect, alone or in combination with one or more of the first through sixth aspects, assigning the allocated RBs to the individual TCI states includes determining that the FDRA field indicates allocated RBGs that are not contiguous but include n contiguous parts, and that a unit of contiguous RBs over which the same precoding is used is wideband, where n is a quantity of the individual TCI states, and assigning each of the n contiguous parts to a respective one of the individual TCI states based at least in part on determining that the resource allocation type is RBG-based.

In an eighth aspect, alone or in combination with one or more of the first through seventh aspects, allocated RBGs indicated in the FDRA field are assigned to the individual TCI states according to a scheme that is determined based at least in part on one or more of a dynamic indicator included in the DCI message, the RRC configuration, or a unit of contiguous RBs over which the same precoding is used based at least in part on determining that the resource allocation type is RBG-based.

In a ninth aspect, alone or in combination with one or more of the first through eighth aspects, assigning the allocated RBs to the individual TCI states includes dividing the allocated RBs into n sets that include an equal or approximately equal number of the allocated RBs, based at least in part on determining that the resource allocation type is based on a non-interleaved mapping from a VRB domain to a PRB domain and that a unit of contiguous RBs over which the same precoding is used is wideband, where n is a quantity of the individual TCI states, and assigning each of the n sets to a respective one of the individual TCI states.

In a tenth aspect, alone or in combination with one or more of the first through ninth aspects, assigning the allocated RBs to the individual TCI states includes assigning an index to each individual RB among the allocated RBs indicated in the FDRA field based at least in part on determining that the resource allocation type is based on a non-interleaved mapping from a VRB domain to a PRB domain without a configured parameter for an RB bundle size and that a unit of contiguous RBs over which the same precoding is used is a value other than wideband, and the index assigned to each individual RB is mapped to a respective one of the individual TCI states according to a function that is based at least in part on a quantity of the individual TCI states.

In an eleventh aspect, alone or in combination with one or more of the first through tenth aspects, the index assigned to each individual RB is determined with respect to one or more of available RBs in an entire bandwidth part or only the allocated RBs indicated in the FDRA field.

In a twelfth aspect, alone or in combination with one or more of the first through eleventh aspects, the allocated RBs are assigned to the individual TCI states according to an RB bundle size based at least in part on determining that the resource allocation type is based on a mapping from a VRB domain to a PRB domain with a configured parameter for the RB bundle size.

In a thirteenth aspect, alone or in combination with one or more of the first through twelfth aspects, assigning the allocated RBs to the individual TCI states includes assigning an index based at least in part on the RB bundle size to each individual RB bundle among allocated RB bundles indicated in the FDRA field, and the index assigned to each individual RB bundle is mapped to a respective one of the individual TCI states according to a function that is based at least in part on a quantity of the individual TCI states.

In a fourteenth aspect, alone or in combination with one or more of the first through thirteenth aspects, the index assigned to each individual RB bundle is determined with respect to one or more of available RB bundles in an entire bandwidth part or only the allocated RB bundles indicated in the FDRA field.

In a fifteenth aspect, alone or in combination with one or more of the first through fourteenth aspects, the function causes a first set of RB bundles that are assigned even indices to be mapped to a first TCI state and causes a second set of RB bundles that are assigned odd indices to be mapped to a second TCI state when the quantity of the individual TCI states is two.

In a sixteenth aspect, alone or in combination with one or more of the first through fifteenth aspects, the function is a modulo operator that causes a set of RB bundles that are assigned a particular index to be mapped to a particular TCI state when dividing the particular index by the quantity of the individual TCI states results in a remainder that equals the particular index.

In a seventeenth aspect, alone or in combination with one or more of the first through sixteenth aspects, assigning the allocated RBs to the individual TCI states includes dividing allocated RB bundles into n sets that include an equal or approximately equal number of the allocated RB bundles based at least in part on the RB bundle size, and assigning each of the n sets to a respective one of the individual TCI states.

In an eighteenth aspect, alone or in combination with one or more of the first through seventeenth aspects, the RB bundle size is indicated in the RRC configuration.

In a nineteenth aspect, alone or in combination with one or more of the first through eighteenth aspects, the allocated RBs include RB bundles that are assigned to the individual TCI states in one or more of the VRB domain or the PRB domain.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    receiving a downlink control information (DCI) message that includes a frequency domain resource allocation (FDRA) field to indicate allocated resource blocks (RBs) across multiple transmission configuration indication (TCI) states;
    identifying, based at least in part on one or more of the DCI message or a radio resource control (RRC) configuration, at least one parameter that indicates a unit of contiguous RBs over which a same precoding is used, wherein the at least one parameter includes one or more of a precoding RB group (PRG) size or a physical RB (PRB) bundle size; and
    assigning the allocated RBs to individual TCI states among the multiple TCI states based at least in part on the at least one parameter that indicates the unit of contiguous RBs over which the same precoding is used, wherein the allocated RBs include allocated PRGs that are assigned to the individual TCI states according to a scheme that is determined based at least in part on one or more of a dynamic indicator included in the DCI message or the RRC configuration when the unit of contiguous RBs over which the same precoding is used is determined to be a value other than wideband, and
    wherein a first set of PRGs or PRBs are assigned to a first TCI state and a second set of PRGs or PRBs are assigned to a second TCI state.

2. The method of claim 1, wherein assigning the allocated RBs to the individual TCI states includes:
    dividing the allocated RBs into n sets that include an equal number of the allocated RBs based at least in part on determining that the allocated RBs are contiguous and when the unit of contiguous RBs over which the same precoding is used is determined to be wideband, where n is a quantity of the individual TCI states; and
    assigning each of the n sets to a respective one of the individual TCI states.

3. The method of claim 2, wherein the equal number of the allocated RBs to include in the n sets is determined using one or more ceiling operations and one or more floor operations based at least in part on a total quantity of the allocated RBs and the quantity of the individual TCI states.

4. The method of claim 2, wherein the unit of contiguous RBs with the same precoding is wideband per TCI state for a frequency division multiplexing (FDM) scheme with the multiple TCI states.

5. The method of claim 2, wherein the allocated RBs are contiguous within the n sets.

6. The method of claim 1, wherein assigning the allocated RBs to the individual TCI states includes:
    determining that the allocated RBs are not contiguous but include n contiguous parts and that the unit of contiguous RBs over which the same precoding is used is wideband, where n is a quantity of the individual TCI states; and
    assigning each of the n contiguous parts to a respective one of the individual TCI states.

7. The method of claim 1, wherein the scheme includes:
    assigning an index to each individual PRG among the allocated PRGs based at least in part on an indication in the FDRA field, wherein the index assigned to each individual PRG is mapped to a respective one of the individual TCI states according to a function that is based at least in part on a quantity of the individual TCI states.

8. The method of claim 7, wherein the function causes the first set of PRGs, that are assigned even indices, to be mapped to the first TCI state and causes the second set of PRGs, that are assigned odd indices, to be mapped to the second TCI state when the quantity of the individual TCI states is two.

9. The method of claim 7, wherein the function is a modulo operator that causes a set of PRGs that are assigned a particular index to be mapped to a particular TCI state when dividing the particular index by the quantity of the individual TCI states results in a remainder that equals the particular index.

10. The method of claim 7, wherein the index assigned to each PRG is determined with respect to an entire bandwidth part.

11. The method of claim 7, wherein the index assigned to each PRG is determined with respect to only the allocated RBs indicated in the FDRA field.

12. The method of claim 1, wherein the scheme includes:
dividing the allocated PRGs into n sets that include an equal number of the allocated PRGs, where n is a quantity of the individual TCI states; and
assigning each of the n sets to a respective one of the individual TCI states.

13. The method of claim 12, wherein the equal number of the allocated RBs to include in the n sets is determined using one or more ceiling operations and one or more floor operations based at least in part on a total quantity of the allocated RBs and the quantity of the individual TCI states.

14. A user equipment (UE) for wireless communication, comprising:
a memory; and
one or more processors operatively coupled to the memory, the memory and the one or more processors configured to:
receive a downlink control information (DCI) message that includes a frequency domain resource allocation field to indicate allocated resource blocks (RBs) across multiple transmission configuration indication (TCI) states;
identify, based at least in part on one or more of the DCI message or a radio resource control configuration, at least one parameter that indicates a unit of contiguous RBs over which a same precoding is used, wherein the at least one parameter includes one or more of a precoding RB group (PRG) size or a physical RB (PRB) bundle size; and
assign the allocated RBs to individual TCI states among the multiple TCI states based at least in part on the at least one parameter that indicates the unit of contiguous RBs over which the same precoding is used,
wherein the allocated RBs include allocated PRGs that are assigned to the individual TCI states according to a scheme that is determined based at least in part on one or more of a dynamic indicator included in the DCI message or the RRC configuration when the unit of contiguous RBs over which the same precoding is used is determined to be a value other than wideband, and
wherein a first set of PRGs or PRBs are assigned to a first TCI state and a second set of PRGs or PRBs are assigned to a second TCI state.

15. The UE of claim 14, wherein the memory and the one or more processors, when assigning the allocated RBs to the individual TCI states, are further configured to:
divide the allocated RBs into n sets that include an equal number of the allocated RBs based at least in part on determining that the allocated RBs are contiguous and when the unit of contiguous RBs over which the same precoding is used is determined to be wideband, where n is a quantity of the individual TCI states; and
assign each of the n sets to a respective one of the individual TCI states.

16. The UE of claim 15, wherein the equal number of the allocated RBs to include in the n sets is determined using one or more ceiling operations and one or more floor operations based at least in part on a total quantity of the allocated RBs and the quantity of the individual TCI states.

17. The UE of claim 15, wherein the unit of contiguous RBs with the same precoding is wideband per TCI state for a frequency division multiplexing (FDM) scheme with the multiple TCI states.

18. The UE of claim 15, wherein the allocated RBs are contiguous within the n sets.

19. The UE of claim 14, wherein the memory and the one or more processors, when assigning the allocated RBs to the individual TCI states, are further configured to:
determine that the allocated RBs are not contiguous but include n contiguous parts and that the unit of contiguous RBs over which the same precoding is used is wideband, where n is a quantity of the individual TCI states; and
assign each of the n contiguous parts to a respective one of the individual TCI states.

20. The UE of claim 14, wherein the scheme includes:
assigning an index to each individual PRG among the allocated PRGs based at least in part on an indication in the FDRA field, wherein the index assigned to each individual PRG is mapped to a respective one of the individual TCI states according to a function that is based at least in part on a quantity of the individual TCI states.

21. The UE of claim 20, wherein the function causes the first set of PRGs, that are assigned even indices, to be mapped to the first TCI state and causes the second set of PRGs, that are assigned odd indices, to be mapped to the second TCI state when the quantity of the individual TCI states is two.

22. The UE of claim 20, wherein the function is a modulo operator that causes a set of PRGs that are assigned a particular index to be mapped to a particular TCI state when dividing the particular index by the quantity of the individual TCI states results in a remainder that equals the particular index.

23. The UE of claim 20, wherein the index assigned to each PRG is determined with respect to an entire bandwidth part.

24. The UE of claim 20, wherein the index assigned to each PRG is determined with respect to only the allocated RBs indicated in the FDRA field.

25. The UE of claim 14, wherein the scheme includes:
dividing the allocated PRGs into n sets that include an equal number of the allocated PRGs, where n is a quantity of the individual TCI states; and
assigning each of the n sets to a respective one of the individual TCI states.

26. The UE of claim 25, wherein the equal number of the allocated RBs to include in the n sets is determined using one or more ceiling operations and one or more floor operations based at least in part on a total quantity of the allocated RBs and the quantity of the individual TCI states.

27. A non-transitory computer-readable medium storing one or more instructions for wireless communication, the one or more instructions comprising:
one or more instructions that, when executed by one or more processors of a user equipment, cause the one or more processors to:

receive a downlink control information (DCI) message that includes a frequency domain resource allocation field to indicate allocated resource blocks (RBs) across multiple transmission configuration indication (TCI) states;

identify, based at least in part on one or more of the DCI message or a radio resource control configuration, at least one parameter that indicates a unit of contiguous RBs over which a same precoding is used, wherein the at least one parameter includes one or more of a precoding RB group (PRG) size or a physical RB (PRB) bundle size; and assign the allocated RBs to individual TCI states among the multiple TCI states based at least in part on the at least one parameter that indicates the unit of contiguous RBs over which the same precoding is used, wherein the allocated RBs include allocated PRGs that are assigned to the individual TCI states according to a scheme that is determined based at least in part on one or more of a dynamic indicator included in the DCI message or the RRC configuration when the unit of contiguous RBs over which the same precoding is used is determined to be a value other than wideband, and wherein a first set of PRGs or PRBs are assigned to a first TCI state and a second set of PRGs or PRBs are assigned to a second TCI state.

28. The non-transitory computer-readable medium of claim 27, wherein the one or more instructions, that cause the one or more processors to assign the allocated RBs to the individual TCI states, cause the one or more processor to:

divide the allocated RBs into n sets that include an equal number of the allocated RBs based at least in part on determining that the allocated RBs are contiguous and when the unit of contiguous RBs over which the same precoding is used is determined to be wideband, where n is a quantity of the individual TCI states;

and assign each of the n sets to a respective one of the individual TCI states.

29. An apparatus for wireless communication, comprising:

means for receiving a downlink control information (DCI) message that includes a frequency domain resource allocation field to indicate allocated resource blocks (RBs) across multiple transmission configuration indication (TCI) states;

means for identifying, based at least in part on one or more of the DCI message or a radio resource control configuration, at least one parameter that indicates a unit of contiguous RBs over which a same precoding is used, wherein the at least one parameter includes one or more of a precoding RB group (PRG) size or a physical RB (PRB) bundle size; and means for assigning the allocated RBs to individual TCI states among the multiple TCI states based at least in part on the at least one parameter that indicates the unit of contiguous RBs over which the same precoding is used, wherein the allocated RBs include allocated PRGs that are assigned to the individual TCI states according to a scheme that is determined based at least in part on one or more of a dynamic indicator included in the DCI message or the RRC configuration when the unit of contiguous RBs over which the same precoding is used is determined to be a value other than wideband, and wherein a first set of PRGs or PRBs are assigned to a first TCI state and a second set of PRGs or PRBs are assigned to a second TCI state.

30. The apparatus of claim 29, wherein the means for assigning the allocated RBs to the individual TCI states comprises:

means for dividing the allocated RBs into n sets that include an equal number of the allocated RBs based at least in part on determining that the allocated RBs are contiguous and when the unit of contiguous RBs over which the same precoding is determined to be wideband, where n is a quantity of the individual TCI states; and means for assigning each of the n sets to a respective one of the individual TCI states.

* * * * *